(12) United States Patent
Zhang et al.

(10) Patent No.: US 11,028,271 B2
(45) Date of Patent: Jun. 8, 2021

(54) FUNCTIONALIZED METAL CHALCOGENIDES OF PARTIALLY IT CRYSTALLINE PHASE

(71) Applicant: Alliance for Sustainable Energy, LLC, Golden, CO (US)

(72) Inventors: Hanyu Zhang, Arvada, CO (US); Eric Edward Benson, Denver, CO (US); Jeffrey Lee Blackburn, Golden, CO (US); Elisa Margaret Link, Denver, CO (US)

(73) Assignee: Alliance for Sustainable Energy, LLC, Golden, CO (US)

(*) Notice: Subject to any disclaimer, the term of this patent is extended or adjusted under 35 U.S.C. 154(b) by 133 days.

(21) Appl. No.: 16/211,622

(22) Filed: Dec. 6, 2018

(65) Prior Publication Data

US 2019/0177550 A1 Jun. 13, 2019

Related U.S. Application Data

(60) Provisional application No. 62/595,828, filed on Dec. 7, 2017.

(51) Int. Cl.
| | | |
|---|---|---|
| *C01G 39/00* | (2006.01) | |
| *C09C 1/00* | (2006.01) | |
| *C01G 39/06* | (2006.01) | |

(52) U.S. Cl.
CPC ............ *C09C 1/0003* (2013.01); *C01G 39/06* (2013.01); *C01P 2002/82* (2013.01); *C01P 2002/85* (2013.01); *C01P 2004/02* (2013.01); *C01P 2004/03* (2013.01); *C01P 2004/04* (2013.01); *C01P 2006/40* (2013.01); *Y10T 428/2991* (2015.01)

(58) Field of Classification Search
CPC .... C01G 39/00; C01G 39/06; Y10T 428/2991
USPC ........................................ 428/403; 423/561.1
See application file for complete search history.

(56) References Cited

U.S. PATENT DOCUMENTS

2017/0101428 A1* 4/2017 Wang ..................... C09K 11/06
2017/0299544 A1* 10/2017 Friedman ................ H01L 29/24

OTHER PUBLICATIONS

Li et al., Synthesis and characterization of vertically standing MoS2 nanosheets, Scientific Reports, 2016 (Year: 2016).*
Ambrosi, A. et al., Lithium Intercalation Compound Dramatically Influences the Electrochemical Properties of Exfoliated $MoS_2$, Small, 2015, vol. 11, No. 5, pp. 605-612.
(Continued)

*Primary Examiner* — Hoa (Holly) Le
(74) *Attorney, Agent, or Firm* — Michael A. McIntyre

(57) ABSTRACT

The present disclosure relates to a composition that includes a metal chalcogenide having a surface and a ligand, where the ligand is covalently bound to the surface. In some embodiments of the present disclosure, the metal chalcogenide may be defined by $MX_z$, where Z is between 1 and 3, inclusively, M (a metal) includes at least one of Sc, Zr, Hf, Zr, Ti, Nb, Ta, V, Mo, Cr, Re, W, S, Pt, Fe, Cu, Sb, In, Zn, Cd, P, and/or Mn, and X (a chalcogenide) includes at least one of S, Se, and/or Te.

11 Claims, 36 Drawing Sheets

(56) References Cited

OTHER PUBLICATIONS

Chou, S. et al., "Ligand Conjugation of Chemically Exfoliated $MoS_2$," Journal of the American Chemical Society, 2013, vol. 135, pp. 4584-4587.
Cui, J. et al., "Plasmon-Enhanced Photoelectrical Hydrogen Evolution on Monolayer $MoS_2$ Decorated $Cu_{1.75}S$-Au Nanocrystals," Small, 2017, vol. 13, 7 pages.
Dai, R. et al., "Metal-Organic-Compound-Modified $MoS_2$ with Enhanced Solubility for High-Performance Perovskite Solar Cells," ChemSusChem, 2017, vol. 10, pp. 2869-2874.
Gao, L. et al., "A Theoretical study for electronic and transport properties of covalent functionalized $MoS_2$ monolayer," Chemical Physics, 2017, vol. 490, pp. 29-37.
Guo, Y. et al., "Surface chemical-modification for engineering the intrinsic physical properties of inorganic two-dimensional nanomaterials," Royal Society of Chemistry, 2015, vol. 44, pp. 637-646.
Jaramillo, T. et al., "Identification of Active Edge Sites for Electrochemical $H_2$ Evolution from $MoS_2$ Nanocatalysts," Science 2007, vol. 317, pp. 100-102.
Kang, Y. et al., "Plasmonic hot electron enhanced $MoS_2$ photocatalysis in hydrogen evolution," Nanoscale, 2015, vol. 7, pp. 4482-4488.
Knirsch, K. et al., "Basal-Plane Functionalization of Chemically Exfoliated Molybdenum Disulfide by Diazonium Salts," ACS Nano, 2015, vol. 9, No. 6, pp. 6018-6030.
Lee, J. et al., "Efficient Hydrogen Evolution by Mechanically Strained $MoS_2$ Nanosheets," Langmuir, 2014, vol. 30, pp. 9866-9873.
Lei, Y. et al., "Low-temperature Synthesis of Heterostructures of Transition Metal Dichalcogenide Alloys ($W_xMo_{1-x}S_2$) and Graphene with Superior Catalytic Performance for Hydrogen Evolution," ACS Nano, 2017, vol. 11, pp. 5103-5112.
Li, H. et al., "Activating and optimizing $MoS_2$ basal planes for hydrogen evolution through the formation of strained sulphur vacancies," Nature Materials, 2016, vol. 15, pp. 48-54.
Li, H. et al., "Stability, bonding and electronic structures of halogenated $MoS_2$ monolayer: A first-principles study," Physica E, 2017, vol. 91, pp. 8-14.
Liu, Q. et al., "Electron-Doped $1T$-$MoS_2$ via Interface Engineering for Enhanced Electrocatalytic Hydrogen Evolution," Chemistry of Materials, 2017, vol. 29, pp. 4738-4744.
Lukowski, M. et al., "Enhanced Hydrogen Evolution Catalysis from Chemically Exfoliated Metallic $MoS_2$ Nanosheets," Journal of the American Chemical Society, 2013, vol. 135, pp. 10274-10277.
Maitra, U. et al., "Highly Effective Visible-Light-Induced $H_2$ Generation by Single-Layer $1T$-$MoS_2$ and a Nanocomposite of Few-Layer $2H$-$MoS_2$ with Heavily Nitrogenated Graphene," Angewandte Chemie, International Edition, 2013, vol. 52, pp. 13057-13061.
Nguyen, E. et al., "Electronic Tuning of 2D $MoS_2$ through Surface Functionalization," Advanced Materials, 2015, vol. 27, pp. 6225-6229.
Seh, Z. et al., "Combining theory and experiment in electrocatalysis: Insights into materials design," Science, 2017, vol. 355, No. 146, 1 page.
Shi, J. et al., "Controllable Growth and Transfer of Monolayer $MoS_2$ on Au Foils and Its Potential Application in Hydrogen Evolution Reaction," ACS Nano, 2014, vol. 8, No. 10, pp. 10196-10204.
Shi, Y. et al., "Hot Electron of Au Nanorods Activates the Electrocatalysis of Hydrogen Evolution on $MoS_2$ Nanosheets," Journal of the American Chemical Society, 2015, vol. 137, pp. 7365-7370.
Sun, Y. et al., "Substrate induced changes in atomically thin 2-dimensional semiconductors: Fundamentals, engineering, and applications," Applied Physics Reviews, 2017, vol. 4, pp. 011301-1 through 011301-19.
Tang, Q. et al., "Stabilization and Band-Gap Tuning of the $1T$-$MoS_2$ Monolayer by Covalent Functionalization," Chemistry of Materials, 2015, vol. 27, pp. 3743-3748.
Tian, X. et al., "Engineering of the interactions of volatile organic compounds with $MoS_2$," Journal of Materials Chemistry C, 2017, vol. 5, pp. 1463-1470.
Vishnoi, P. et al., "Covalent Functionalization of Nanosheets of $MoS_2$ and $MoSe_2$ by Substituted Benzenes and Other Organic Molecules," Chemistry European Journal, 2017, vol. 23, pp. 886-895.
Voiry, D. et al., "Conducting $MoS_2$ Nanosheets as Catalysts for Hydrogen Evolution Reaction," ACS Nano Letters, 2013, vol. 13, pp. 6222-6227.
Voiry, D. et al., "Covalent functionalization of monolayered transition metal dichalcogenides by phase engineering," Nature Chemistry, 2015, vol. 7, pp. 45-49.
Wang, H. et al., "Physical and chemical tuning of two-dimensional transition metal dichalcogenides," Chem. Soc. Rev., 2015, vol. 44, pp. 2664-2680.
Yang, X. et al., "Greatly improved mechanical and thermal properties of chitosan by carboxyl-functionalized $MoS_2$ nanosheets," Journal of Materials Science, 2016, vol. 51, pp. 1344-1353.
Yin, Y. et al., "Contributions of Phase, Sulfur Vacancies, and Edges to the Hydrogen Evolution Reaction Catalytic Activity of Porous Molybdenum Disulfide Nanosheets," Journal of the American Chemical Society, 2016, vol. 138, pp. 7965-7972.
Yu, X. et al., "Toward Large-Area Solar Energy Conversion with Semiconducting 2D Transition Metal Dichalcogenides," ACS Energy Letters, 2016, vol. 1, pp. 315-322.
Zhou, K. et al., "The effective reinforcements of functionalized $MoS_2$ nanosheets in polymer hybrid composites by sol-gel technique," Composites: Part A, 2017, vol. 94, pp. 1-9.
Zhou, L. et al., "Facile approach to surface functionalized $MoS_2$ nanosheets," RSC Advances, 2014, vol. 4, pp. 32570-32578.
Zhu, X. et al., "Tunable photoluminescence of MoSquantum dots passivated by different functional groups," Journal of Colloid and Interface Science, 2018, vol. 511, pp. 209-214.

\* cited by examiner

FUNCTIONALIZED METAL CHALCOGENIDES OF PARTIALLY IT CRYSTALLINE PHASE

CROSS-REFERENCE TO RELATED APPLICATION

This application claims priority from U.S. Provisional Application No. 62/595,828, filed Dec. 7, 2017, the disclosure of which is incorporated herein by reference in its entirety.

CONTRACTUAL ORIGIN

The United States Government has rights in this disclosure under Contract No. DE-AC36-08GO028308 between the United States Department of Energy and Alliance for Sustainable Energy, LLC, the Manager and Operator of the National Renewable Energy Laboratory.

BACKGROUND

Electrochemical reduction of protons to molecular hydrogen ($H_2$) is a carbon-free energy conversion technology that, with increased research and development, could be a front-runner for renewable fuels. Currently, the most efficient catalyst (platinum) for $H_2$ generation is too expensive and consequently is not produced on a large enough scale to be used as a global energy resource. Therefore, a lower cost catalyst with high efficiency is needed.

SUMMARY

An aspect of the present disclosure is a composition that includes a metal chalcogenide having a surface and a ligand, where the ligand is covalently bound to the surface. In some embodiments of the present disclosure, the metal chalcogenide may be defined by $MX_z$, where Z is between 1 and 3, inclusively, M (a metal) includes at least one of Sc, Zr, Hf, Zr, Ti, Nb, Ta, V, Mo, Cr, Re, W, S, Pt, Fe, Cu, Sb, In, Zn, Cd, P, and/or Mn, and X (a chalcogenide) includes at least one of S, Se, and/or Te.

In some embodiments of the present disclosure, the metal chalcogenide may include at least one of $WTe_2$, $WSe_2$, $WS_2$, $MoS_2$, $MoSe_2$, and/or $MoTe_2$. In some embodiments of the present disclosure, the metal chalcogenide may include at least one of $ScS_2$, $ScSe_2$, $SeTe_2$, $ZrS_2$, $ZrSe_2$, $HfS_2$, $HfSe_2$, $HfS_3$, $HfSe_3$, $ZrS_3$, $ZrSe_3$, $ZrTe_3$, $TiS_2$, $TiS_3$, $TiSe_3$, $NbS_2$, $NbSe_2$, $NbS_3$, $TaS_2$, $TaSe_2$, $TaS_3$, $TaSe_3$, $VS_2$, $VSe_2$, $MoReS_2$, $CrS_2$, $WSSe_2$, $MoSSe$, $MoWSe_2$, $MoTe_2$, $WTe_2$, $WS_2$, $MoS_2$, $MoSe_2$, $MoTe_2$, $ReS_2$, $ReSe_2$, $ReNbS_2$, $ReNbSe_2$, $PtS_2$, $PtSe_2$, $PtTe_2$, $FeSe$, $CuS$, $CuSbS_2$, $CuInS_2$, $CuInSe_2$, $ZnS$, $ZnSe$, $CdS$, $CdSe$, $FePS_3$, $FePSe_3$, $MnPS_3$, $MnPSe_3$, $CdPS_3$, and/or $CdPSe_3$. In some embodiments of the present disclosure, metal chalcogenide may be in a form comprising at least one of a sheet and/or a particle. In some embodiments of the present disclosure, the sheet may include at least one monolayer of the metal chalcogenide. In some embodiments of the present disclosure, the sheet may have a thickness between 5.0 nm and 30 nm. In some embodiments of the present disclosure, the particle may have a characteristic length between 5.0 nm and 50,000 nm.

In some embodiments of the present disclosure, the ligand may have at least one of an electron donating functional group and/or an electron withdrawing functional group, as measured by at least one of a Hammett parameter and/or a work function. In some embodiments of the present disclosure, the ligand may include a moiety that includes at least one of a halogen, an amine, an amide, a ketone, thiol, and/or a nitro group. In some embodiments of the present disclosure, the ligand may further include an intermediate group that includes at least one of an aromatic group, a saturated hydrocarbon chain, and/or an unsaturated hydrocarbon chain. In some embodiments of the present disclosure, the aromatic group may be a phenyl ring (Ph). In some embodiments of the present disclosure, the ligand may include at least one of $NO_2Ph$, $ClPh$, $BrPh$, $OCH_3Ph$, and/or $(CH_3CH_2)_2NPh$, and the moiety may be in at least one of the ortho position, the meta position, and/or the para position of the phenyl ring. In some embodiments of the present disclosure, the ligand may include at least one of p-$NO_2Ph$, 3,5-$Cl_2Ph$, p-BrPh, p-$OCH_3Ph$, and/or p-$(CH_3CH_2)_2NPh$ In some embodiments of the present disclosure, the metal chalcogenide may be in a substantially crystalline phase. In some embodiments of the present disclosure, at least a portion of the crystalline phase may be a 1 T metallic phase. In some embodiments of the present disclosure, the Hammett parameter may be between −0.5 and 1.0, inclusively. In some embodiments of the present disclosure, the work function may be between 3.0 eV and 6.0 eV, inclusively. In some embodiments of the present disclosure, the composition may catalyze the hydrogen evolution reaction (HER), and the composition may generate a HER catalytic current density of at least 10 mA/cm$^2$ when provided with an overpotential of less than 1000 mV.

An aspect of the present disclosure is a composition that includes $MoS_2$ in a form of at least one of a particle and/or a sheet and a ligand covalently bound to the $MoS_2$, where the ligand includes at least one of p-$NO_2Ph$-, 3,5-$Cl_2Ph$-, p-BrPh-, p-$OCH_3Ph$-, and/or p-$(CH_3CH_2)_2NPh$-, the $MoS_2$ is it least partially in a 1 T crystalline phase and maintains the 1 T crystalline phase for at least two hours, the form has a characteristic length between 5.0 nm and 50,000 nm, inclusively, the composition is characterized by a Hammett parameter between −0.5 and 1.0, inclusively, the composition catalyzes the hydrogen evolution reaction (HER), and the composition generates a HER catalytic current density of about 10 mA/cm$^2$ when provided with an overpotential of less than 1000 mV.

BRIEF DESCRIPTION OF THE DRAWINGS

Exemplary embodiments are illustrated in referenced figures of the drawings. It is intended that the embodiments and figures disclosed herein are to be considered illustrative rather than limiting.

Figure 1A:
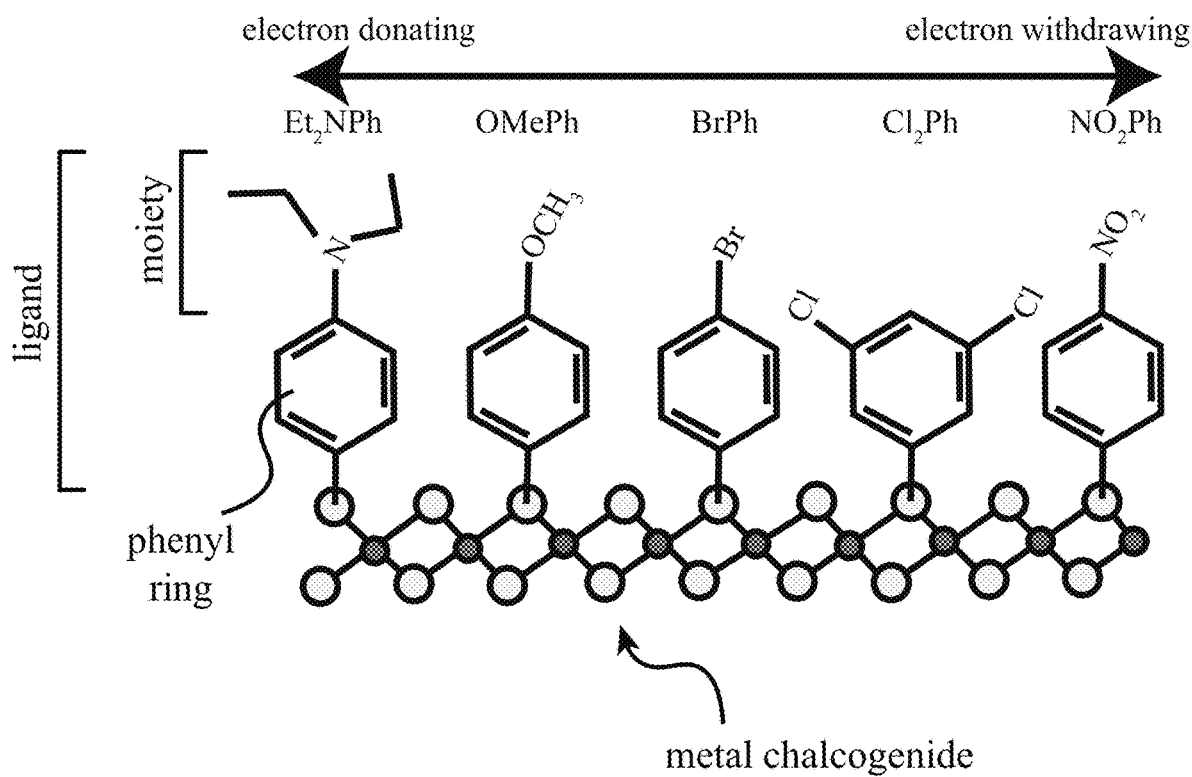
FIG. 1A illustrates a schematic of the various ligands on metallic phase, a metal chalcogenide, for example $MoS_2$, according to some embodiments of the present disclosure.

Although the ligands in FIG. 1A are shown in the para position on the phenyl rings, ligands in at least one of the para position, the ortho position, and/or the meta position of a phenyl ring are considered within the scope of the present disclosure.

Figure 1B:
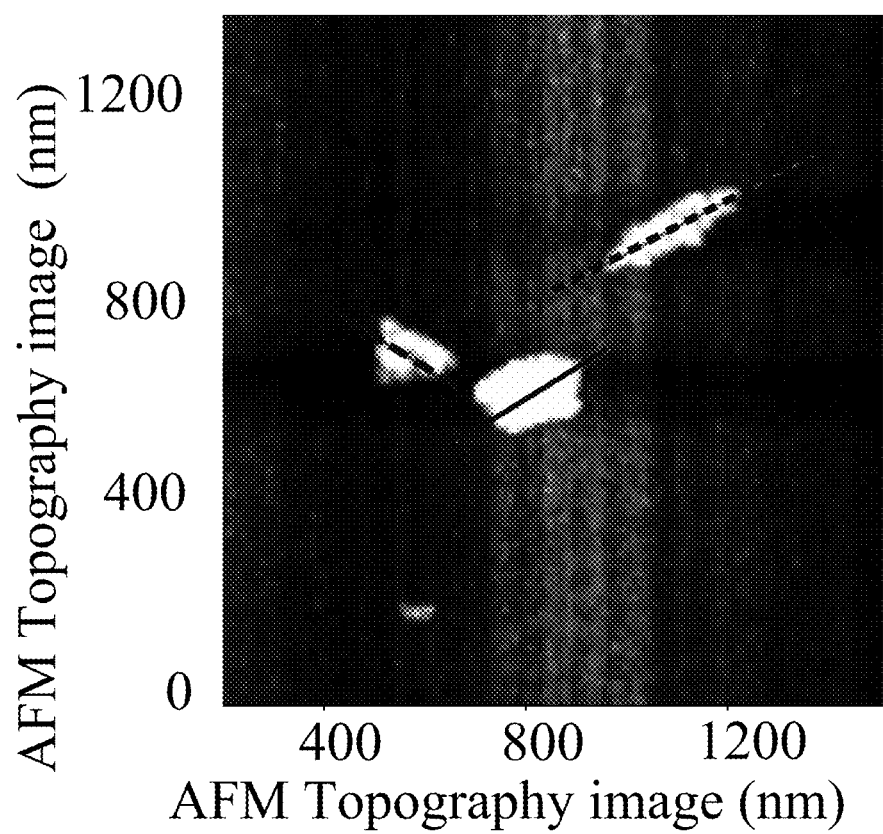

FIG. 1B illustrates an atomic force microscopy (AFM) image of a chemically exfoliated metallic $MoS_2$ nanosheets, according to some embodiments of the present disclosure.

Figure 1C:
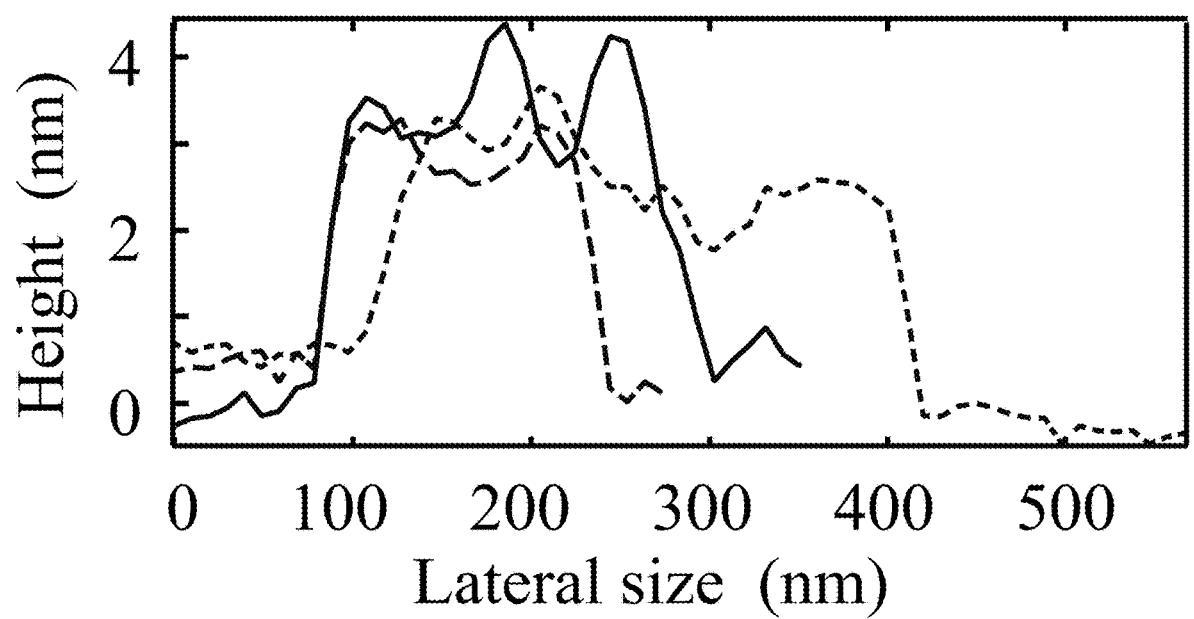

FIG. 1C illustrates extracted line profiles that demonstrate the height and length of chemically exfoliated metallic $MoS_2$ nanosheets. A height distribution of 3 nm to 5 nm and a length distribution of 250 nm to 400 nm are observed from the AFM topographic image (FIG. 1B).

Figure 2A:
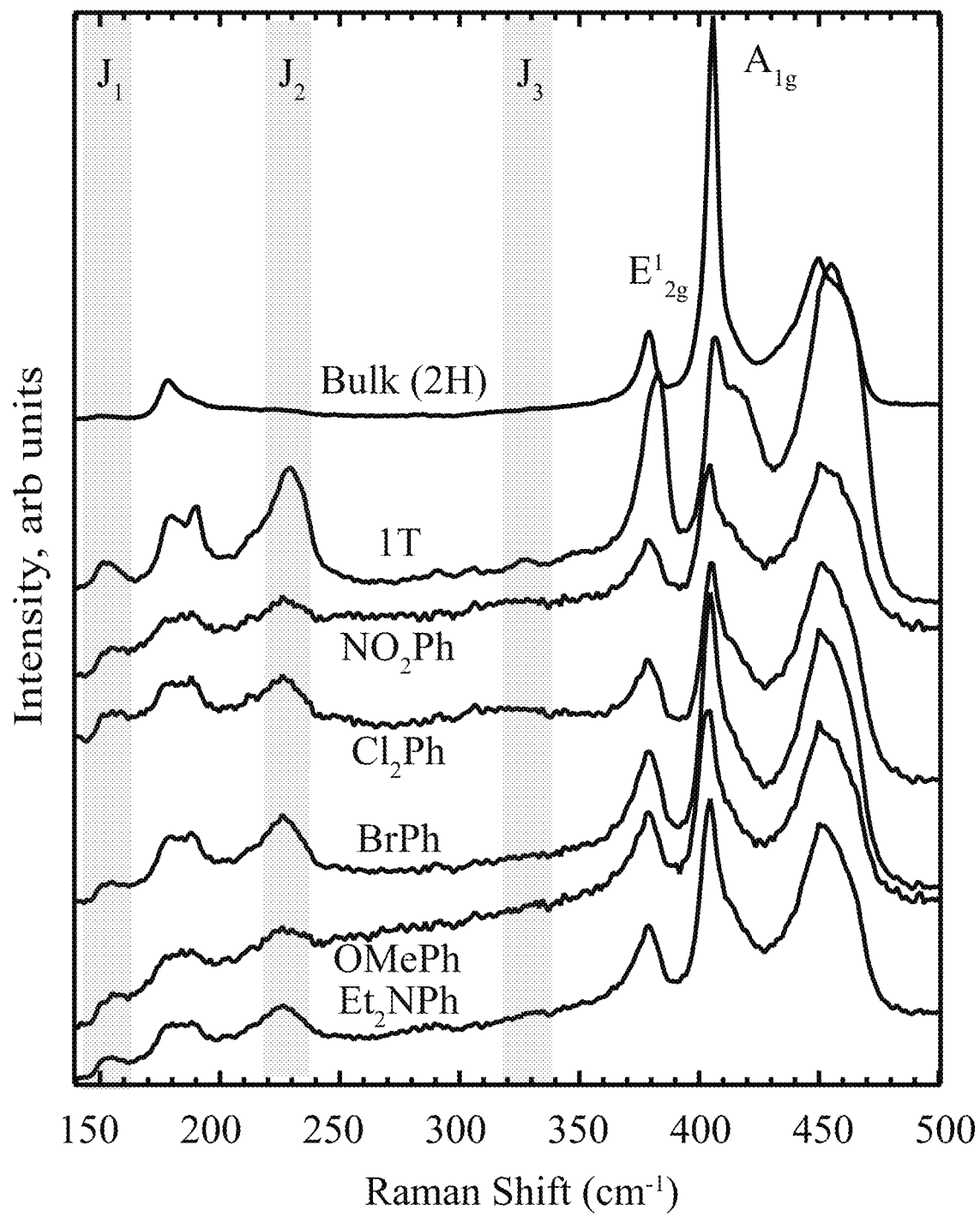

FIG. 2A illustrates Raman spectra of pristine and functionalized metallic phase $MoS_2$ along with bulk semiconducting phase $MoS_2$ as a comparison, according to some embodiments of the present disclosure. The spectra were taken with an excitation wavelength of 633 nm. All spectra contain the expected $MoS_2$ transitions: $E^1_{2g}$ (~383 cm$^{-1}$) and $A_{1g}$ (~406 cm$^{-1}$). The metallic phase $MoS_2$ has the characteristic metallic peaks ($J_1$, $J_2$, and $J_3$ located at ~154, ~230, and ~326 cm$^{-1}$, respectively). The functionalized $MoS_2$ spectra have the $J_1$ and $J_2$ peaks but do not have the $J_3$ peak.

Figure 2B:
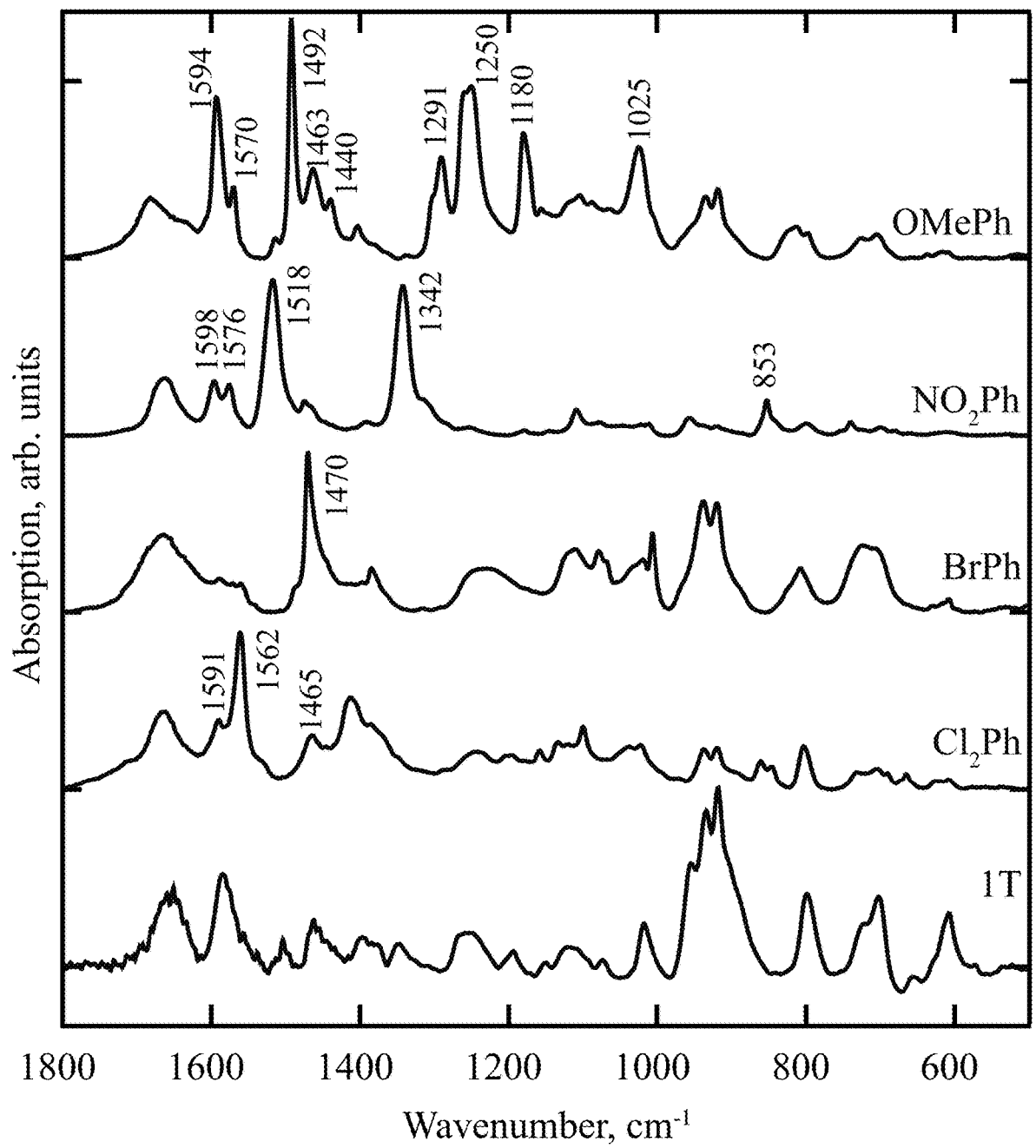

FIG. 2B illustrates DRIFTS spectra of $MoS_2$ nanosheets, both functionalized and unfunctionalized metallic phase, according to some embodiments of the present disclosure.

Figure 3A:
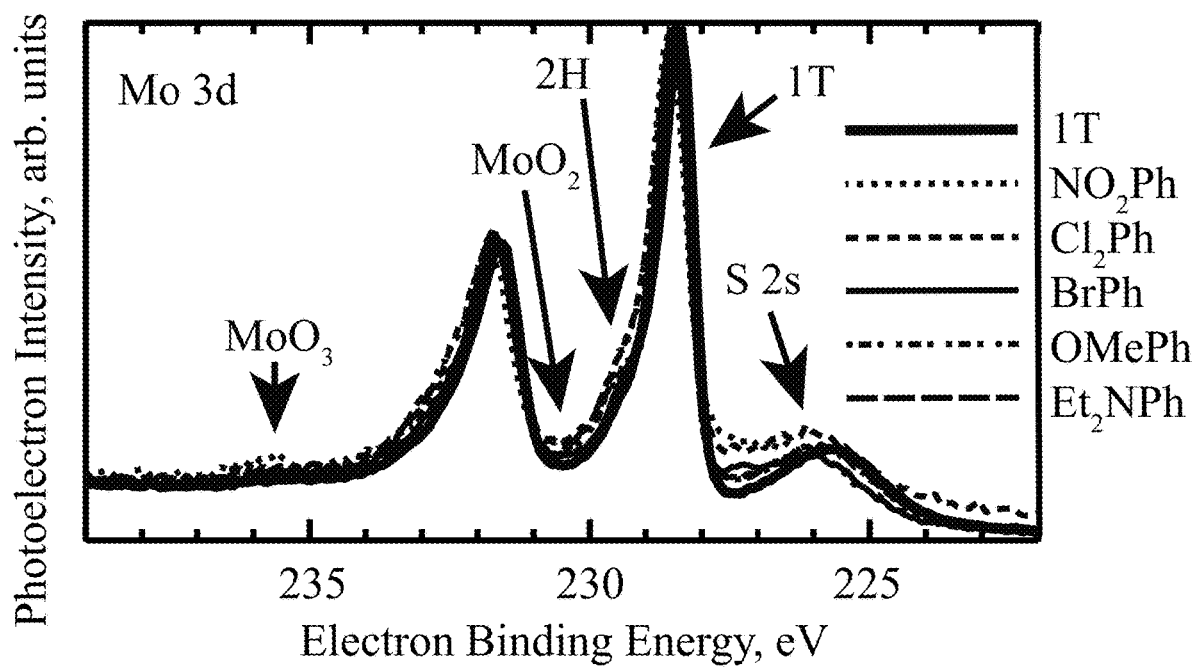
Figure 3B:
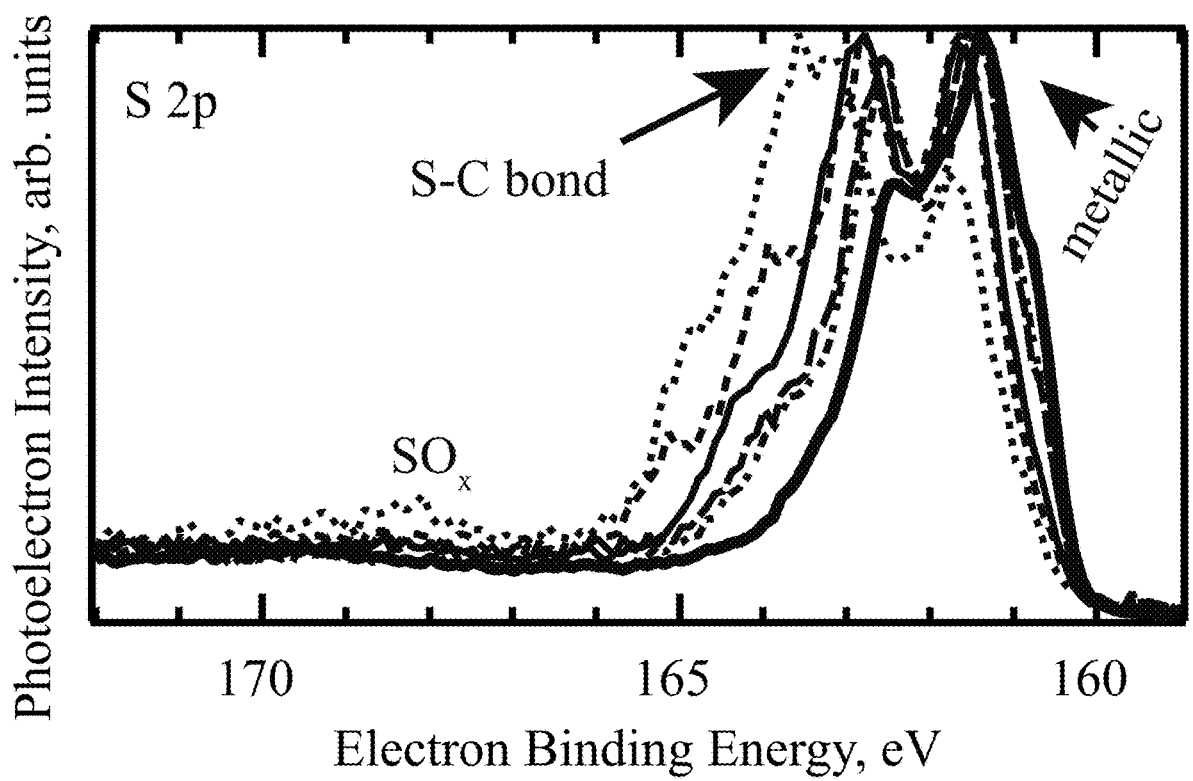

FIGS. 3A and 3B illustrate XPS of (FIG. 3A) Mo 3d and (FIG. 3B) S 2p for unfunctionalized metallic (1 T) $MoS_2$ and functionalized metallic $MoS_2$, according to some embodiments of the present disclosure. Since the ligands attach to the S atom, the Mo 3d spectra are similar and the S 2p spectra differ between unfunctionalized and functionalized $MoS_2$. The Mo 3d spectra highlight that the $MoS_2$ is dominated by the metallic phase.

Figure 3C:
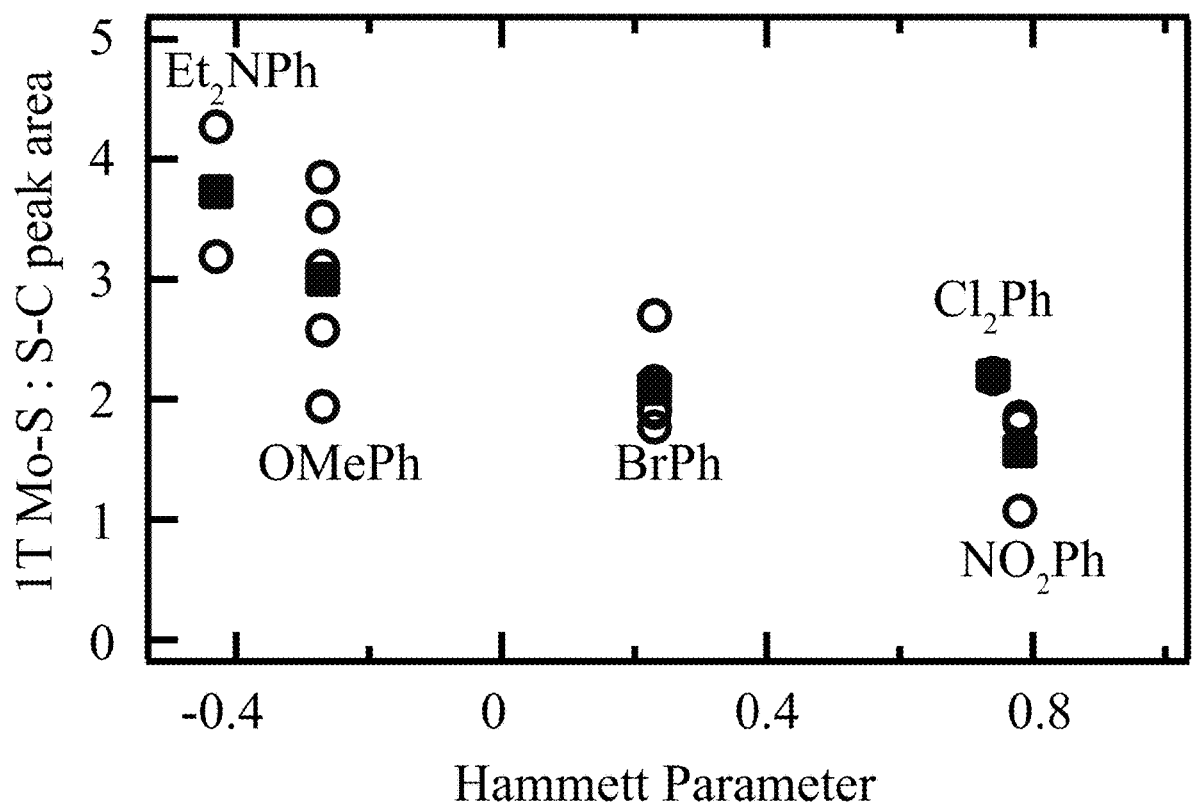

FIG. 3C illustrates the ratio of metallic Mo—S to S—C S 2p XPS peak areas as a function of Hammett parameter. The more electron withdrawing ligands (more positive Hammett parameter) have more ligands attached to the $MoS_2$ nanosheets than electron donating ligands (negative Hammett parameter)

Figure 4:
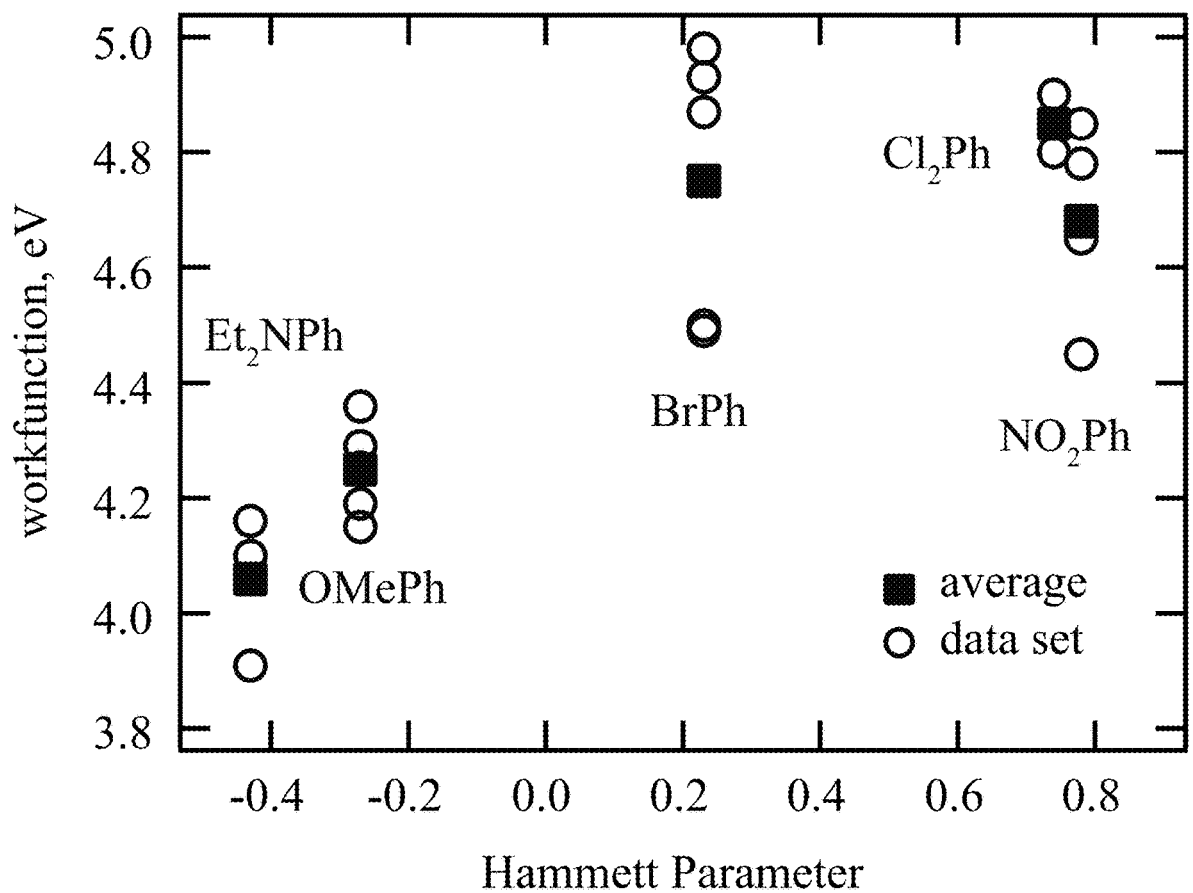

FIG. 4 illustrates the relationship between work function and Hammett parameter, according to some embodiments of the present disclosure. The most electron donating ligand ($Et_2NPh$) has the shallowest work function. The Hammett parameter has a positive correlation to the work function and varies by 800 meV over the various ligands.

Figure 5A:
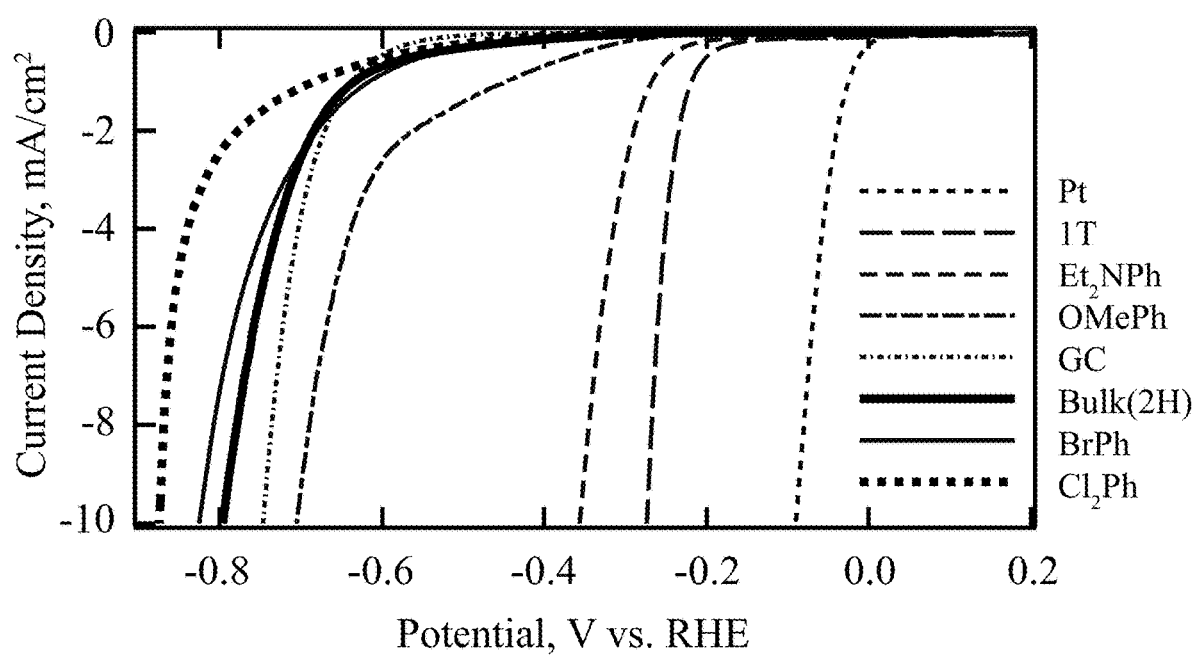
Figure 5B:
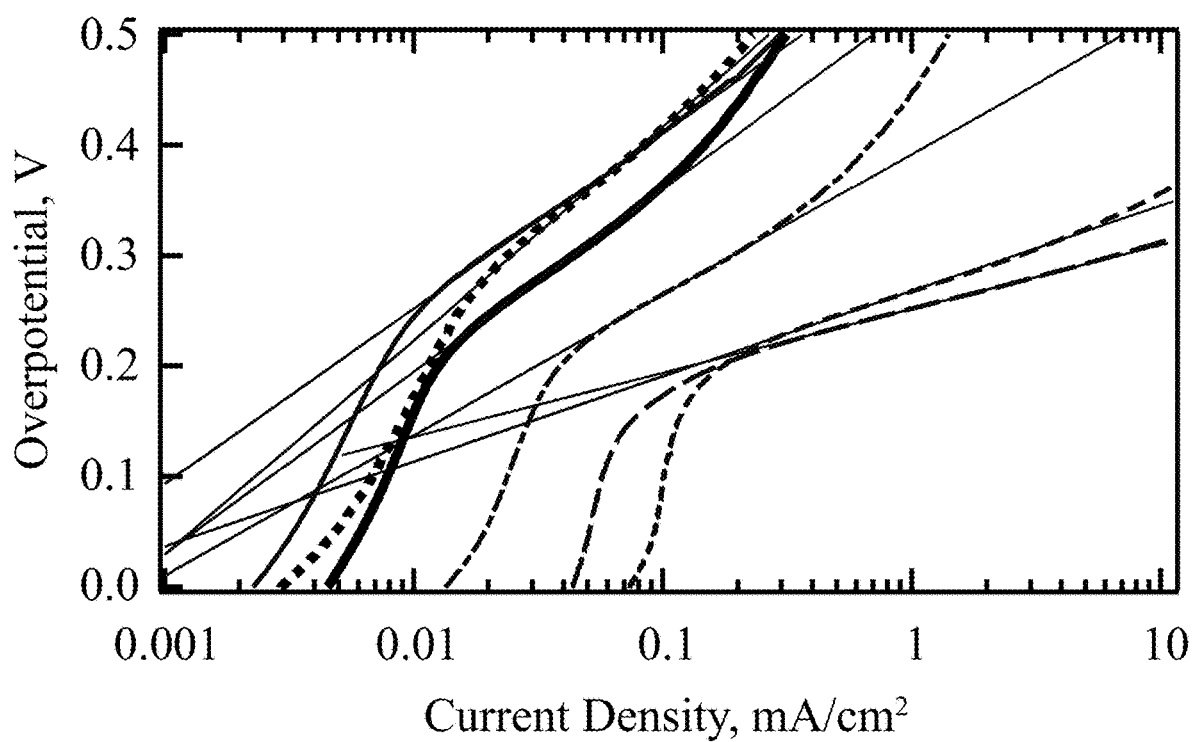

FIG. 5A illustrates linear sweep voltammograms (LSV) and FIG. 5B the corresponding Tafel plots for glassy carbon electrodes deposited with functionalized and unfunctionalized metallic $MoS_2$ as well as the unfunctionalized bulk semiconducting phase of $MoS_2$, according to some embodiments of the present disclosure. LSVs were taken at 5 mV/s in 0.5 M $H_2SO_4$ with a Ag/AgCl reference electrode and vitreous carbon counter electrode. Both panels have been iR corrected. Pt and glassy carbon electrodes for the hydrogen evolution reaction (HER) are included in FIG. 5A as a reference.

Figure 6A:
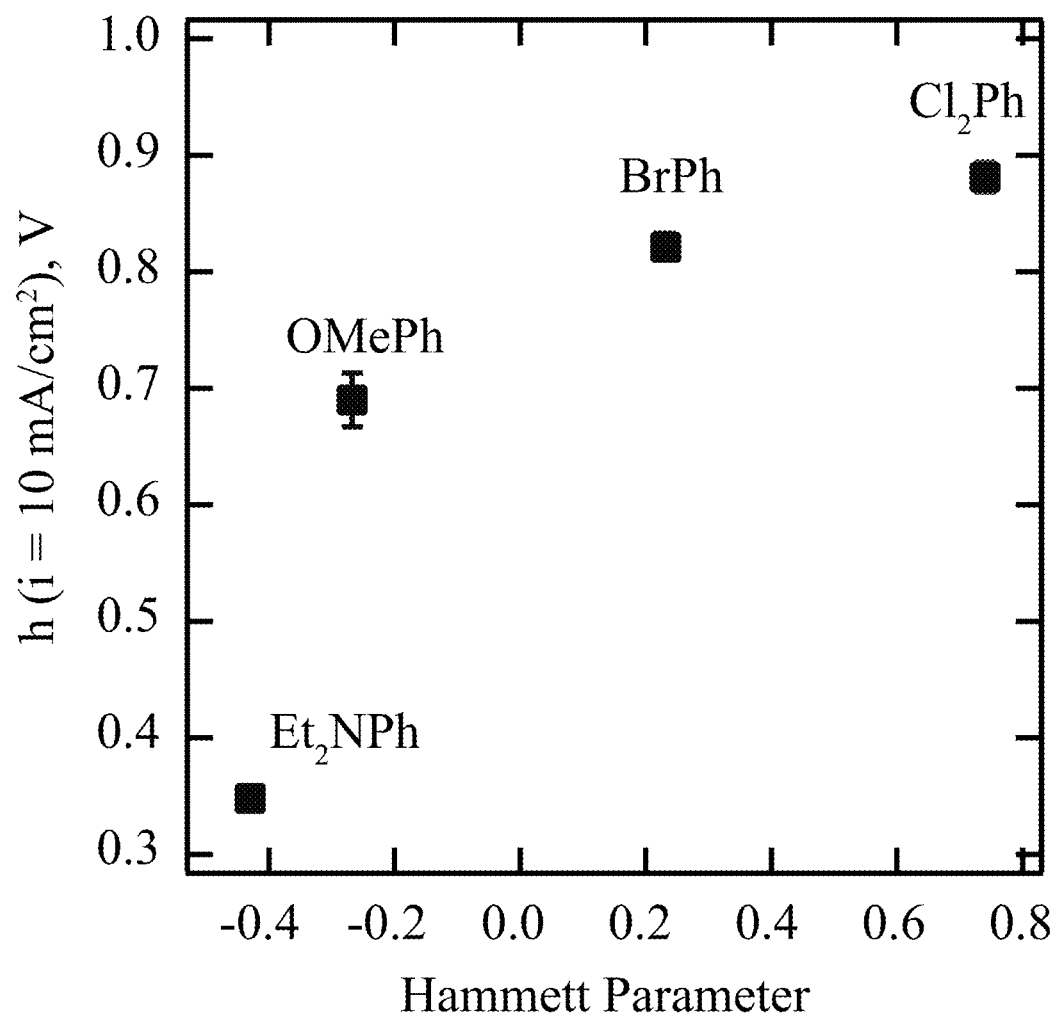
Figure 6B:
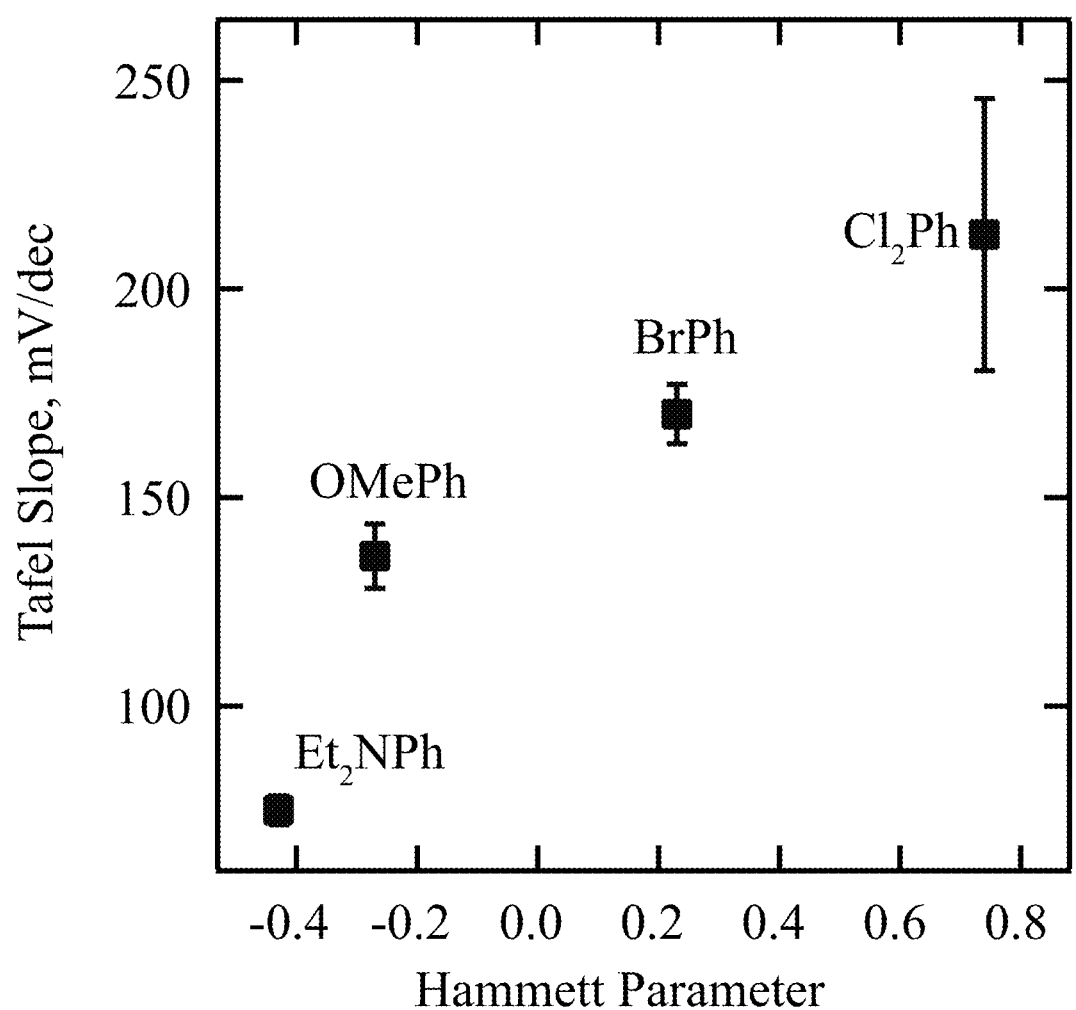

FIG. 6A illustrates the average overpotential (taken at current density of 10 mA/cm$^2$) and FIG. 6B the Tafel slope for the $MoS_2$ functionalized electrodes, according to some embodiments of the present disclosure. Measurements were performed in 0.5 M $H_2SO_4$ with a Ag/AgCl reference electrode and a vitreous carbon counter electrode.

Figure 7:
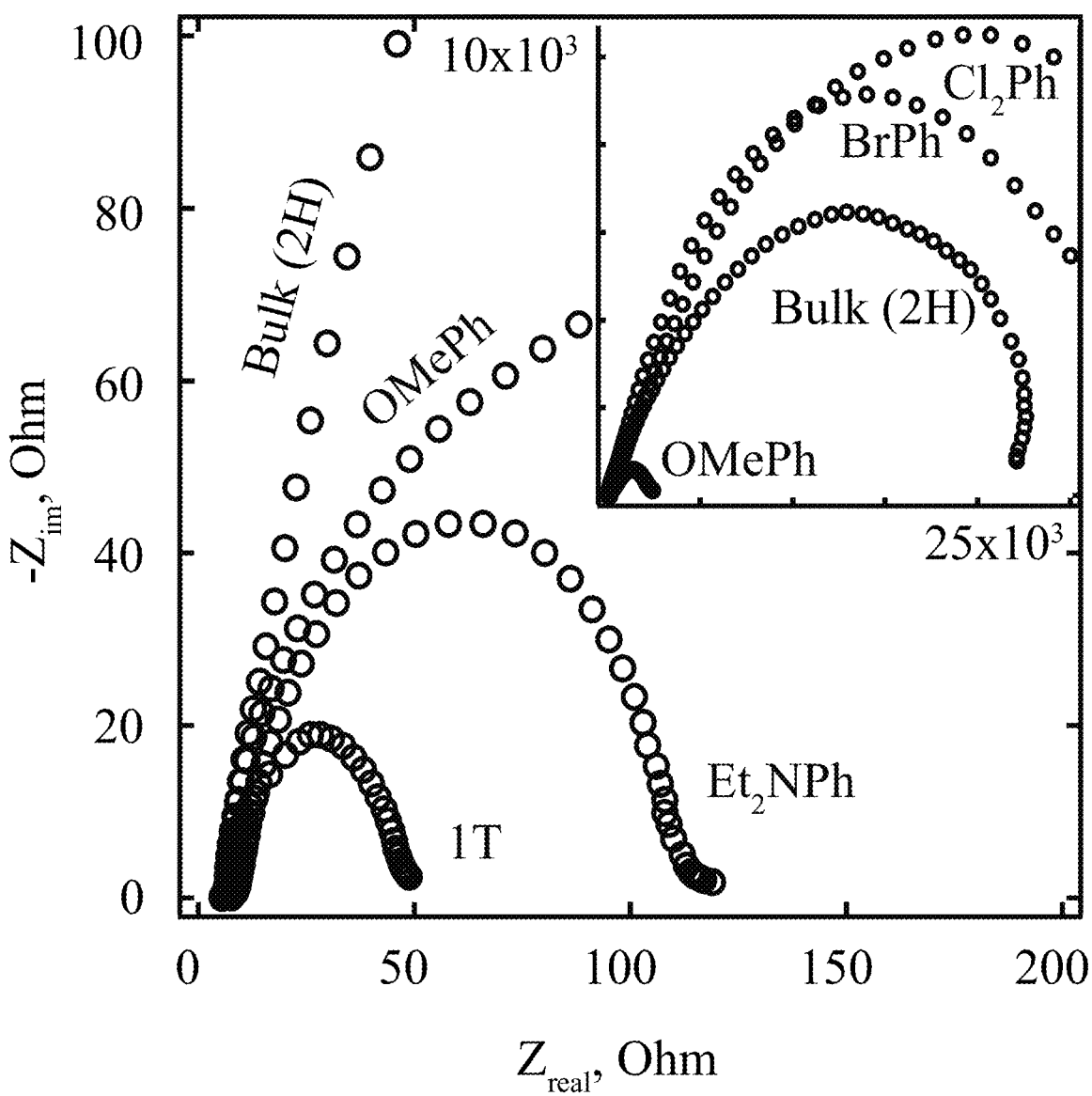
Figure 8A:
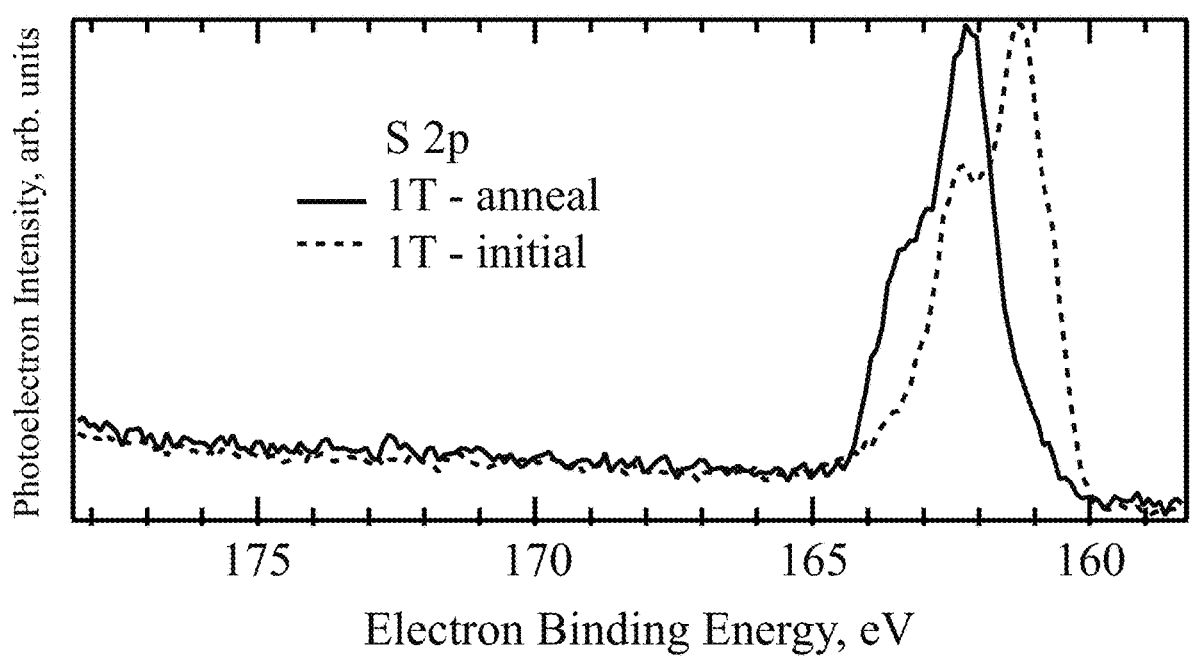
Figure 8B:
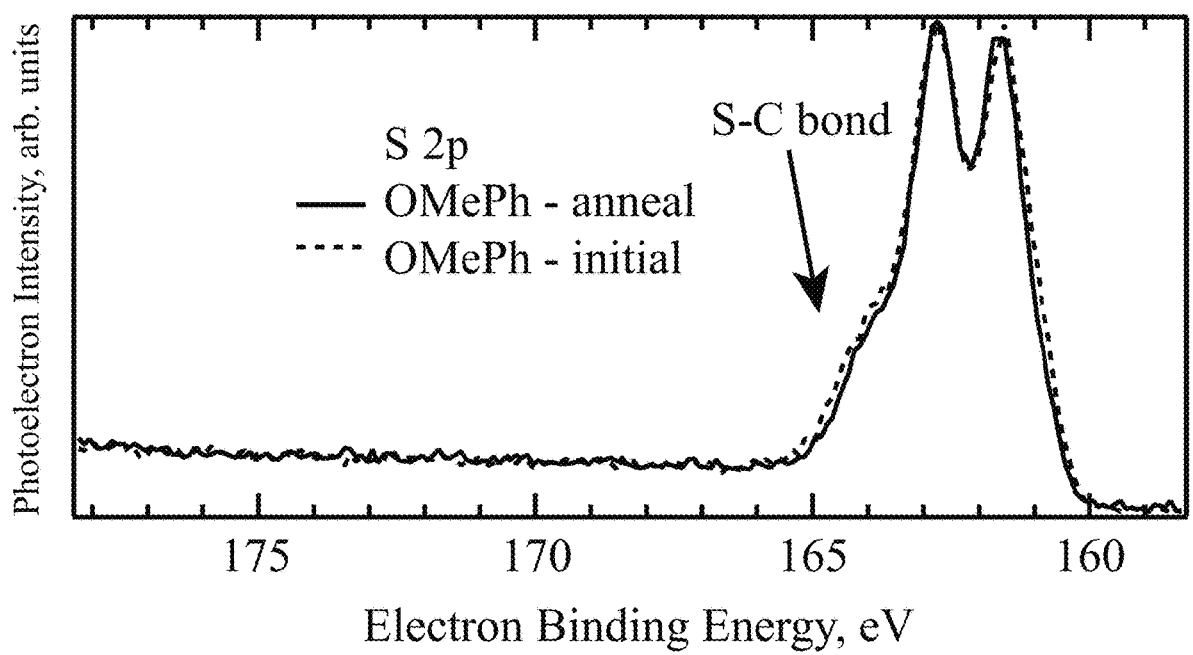
Figure 8C:
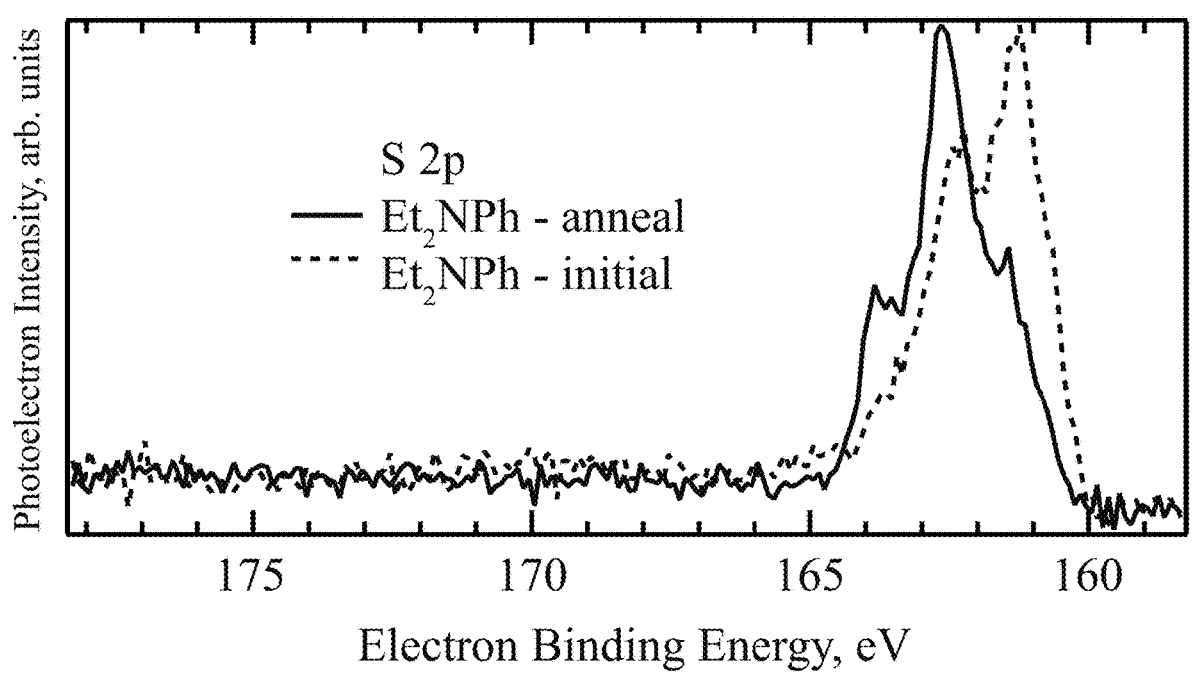
Figure 8D:
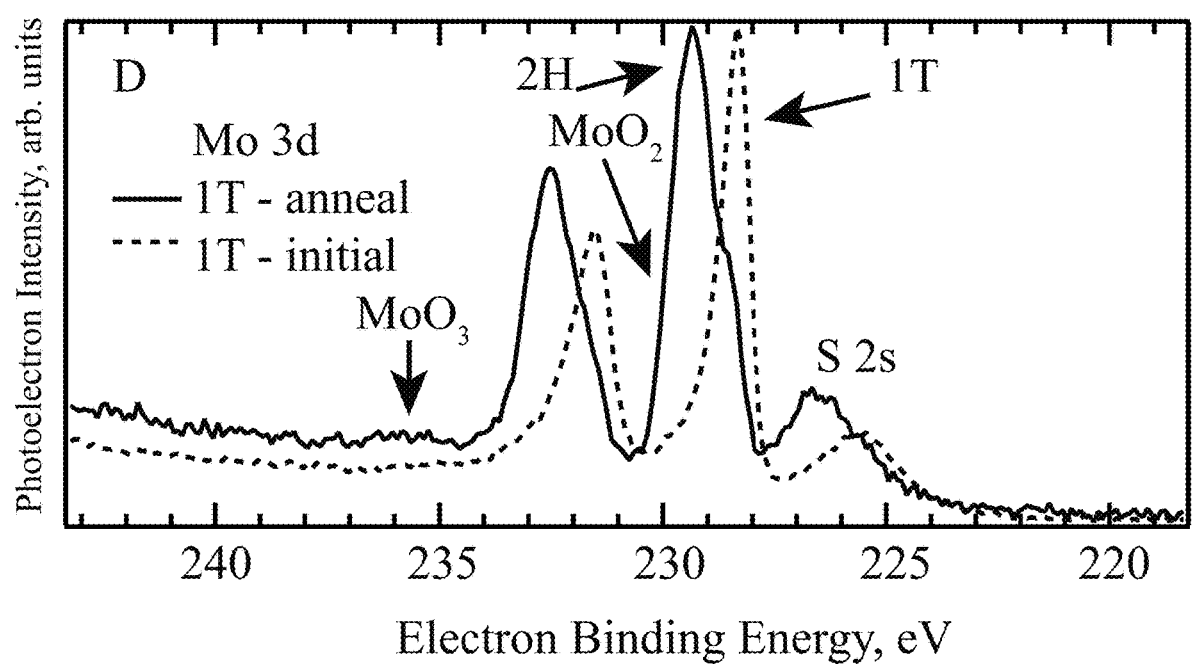
Figure 8E:
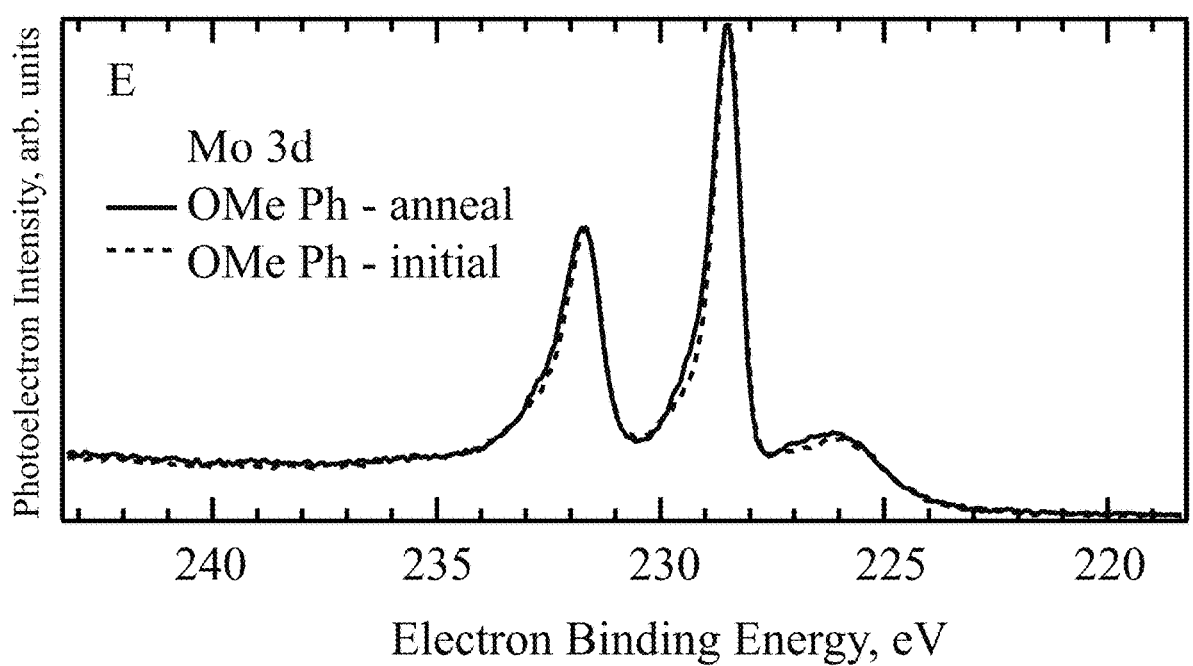
Figure 8F:
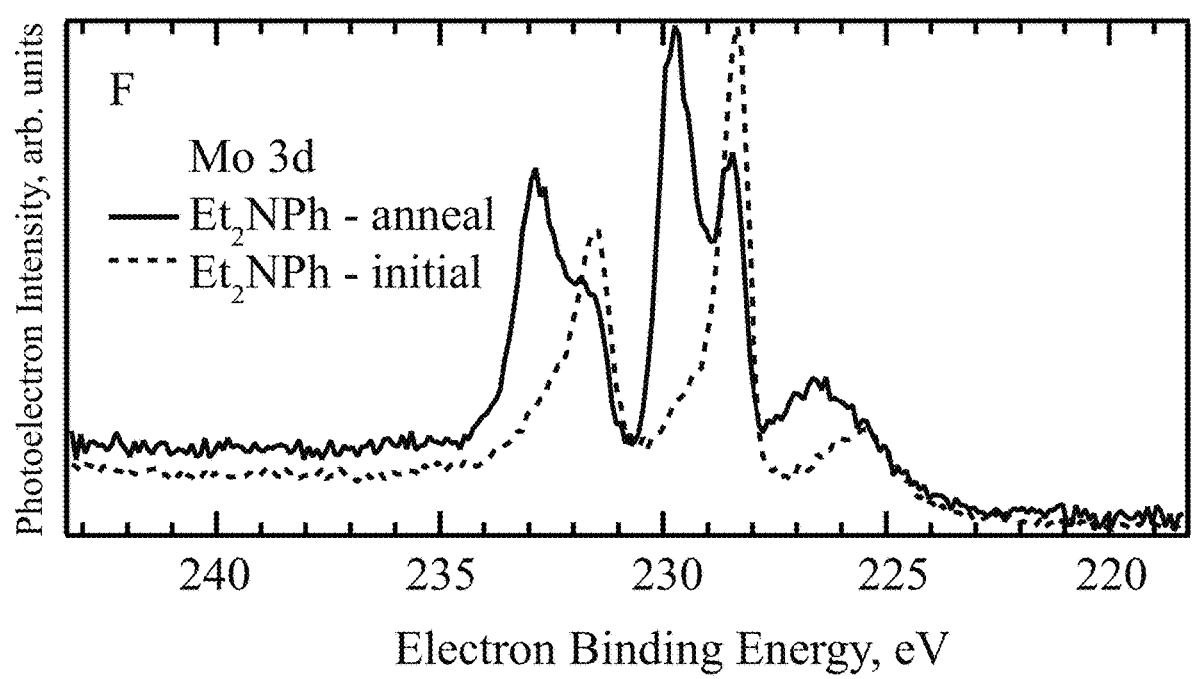

FIG. 7 illustrates the electrochemical impedance spectra (Nyquist plots) for functionalized metallic phase $MoS_2$, unfunctionalized metallic phase $MoS_2$, and unfunctionalized bulk semiconducting phase $MoS_2$ on glassy carbon electrode at −0.29 V vs RHE, according to some embodiments of the present disclosure.

FIGS. 8A-8F illustrate XPS spectra: XPS spectra of S 2p (FIGS. 8A-8C) and Mo 3d (FIGS. 8D-8F) spectra before (dashed trace) and after annealing (solid trace) for unfunctionalized metallic $MoS_2$ (FIGS. 8A and 8D) and functionalized (FIGS. 8B, 8C, 8E, and 8F) metallic $MoS_2$, according to some embodiments of the present disclosure. The nanosheets were annealed in a $N_2$ atmosphere for 24 hours at 150° C. The functional groups protected the $MoS_2$ from undergoing conversion from the metallic phase to the semiconducting phase. The $Et_2NPh$ $MoS_2$ (FIGS. 8C and 8F) underwent some conversion to the semiconducting (2H) phase.

Figure 9A:
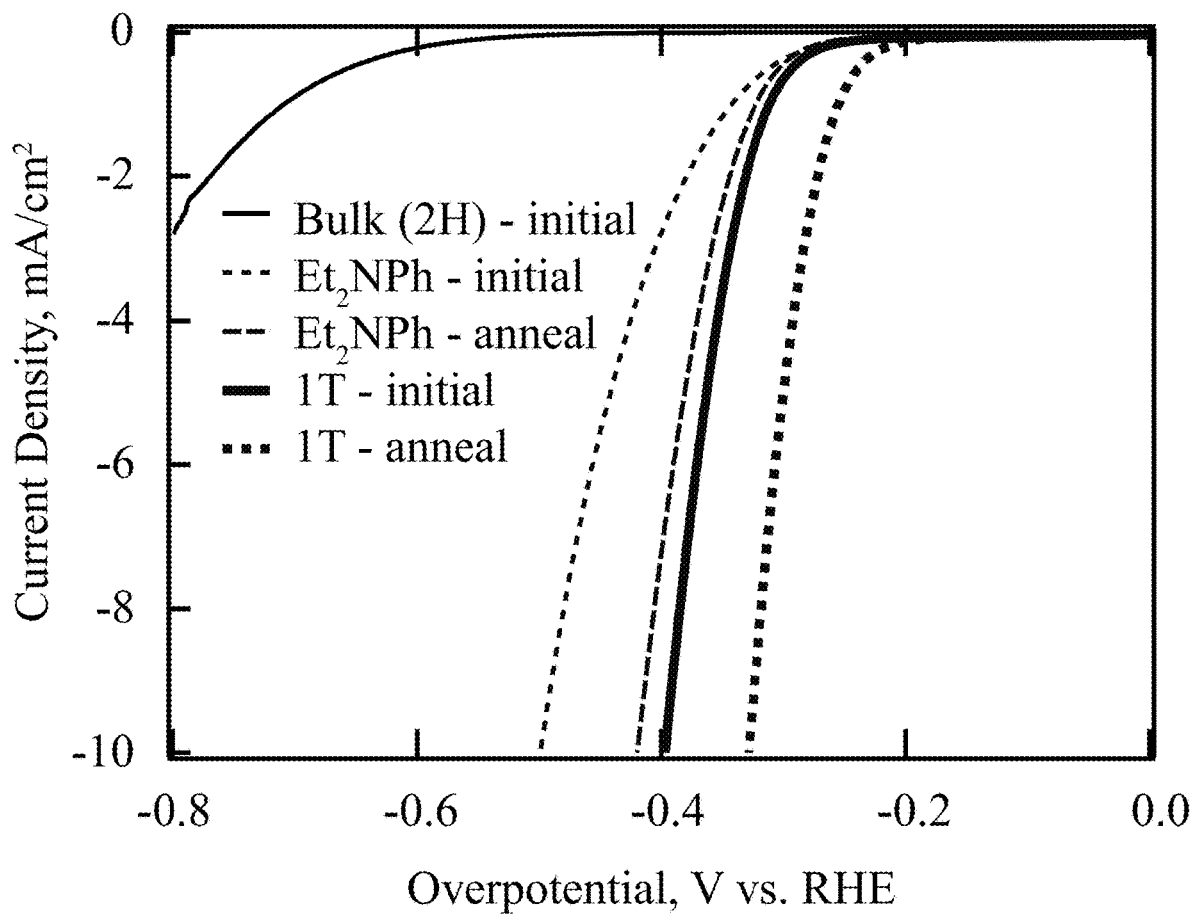
Figure 9B:
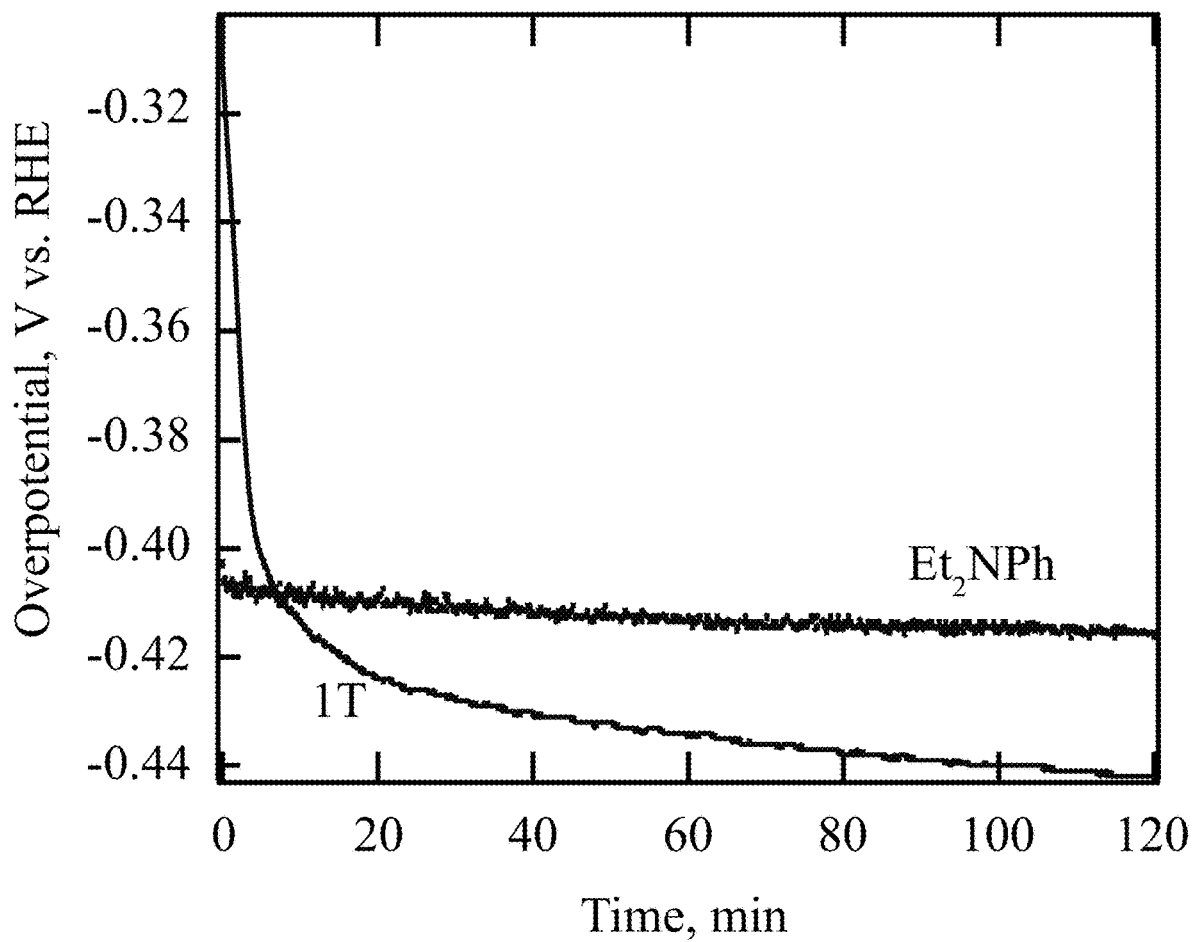

FIGS. 9A and 9B illustrate HER stability tests for $Et_2NPh$ and metallic phase $MoS_2$: FIG. 9A illustrates LSV for glassy carbon electrodes deposited with $Et_2NPh$ and metallic (1 T), according to some embodiments of the present disclosure. The scans were performed for as prepared electrodes and then electrodes following an anneal in a $N_2$ glovebox at 150° C. for 24 hours. The as prepared bulk (2H) $MoS_2$ electrodes are also shown for comparison. LSVs were taken at 5 mV/s in 0.5 M $H_2SO_4$ with an Ag/AgCl reference electrode and a vitreous carbon counter electrode. FIG. 9B illustrates the overpotential measured as a function of time to maintain a current density of 10 mA/cm$^2$ for the $Et_2NPh$ and metallic (1 T) $MoS_2$ electrodes. $Et_2NPh$ functionalized metallic $MoS_2$ outperformed the unfunctionalized metallic $MoS_2$ for $H_2$ generation within ~7 min.

Figure 10A:
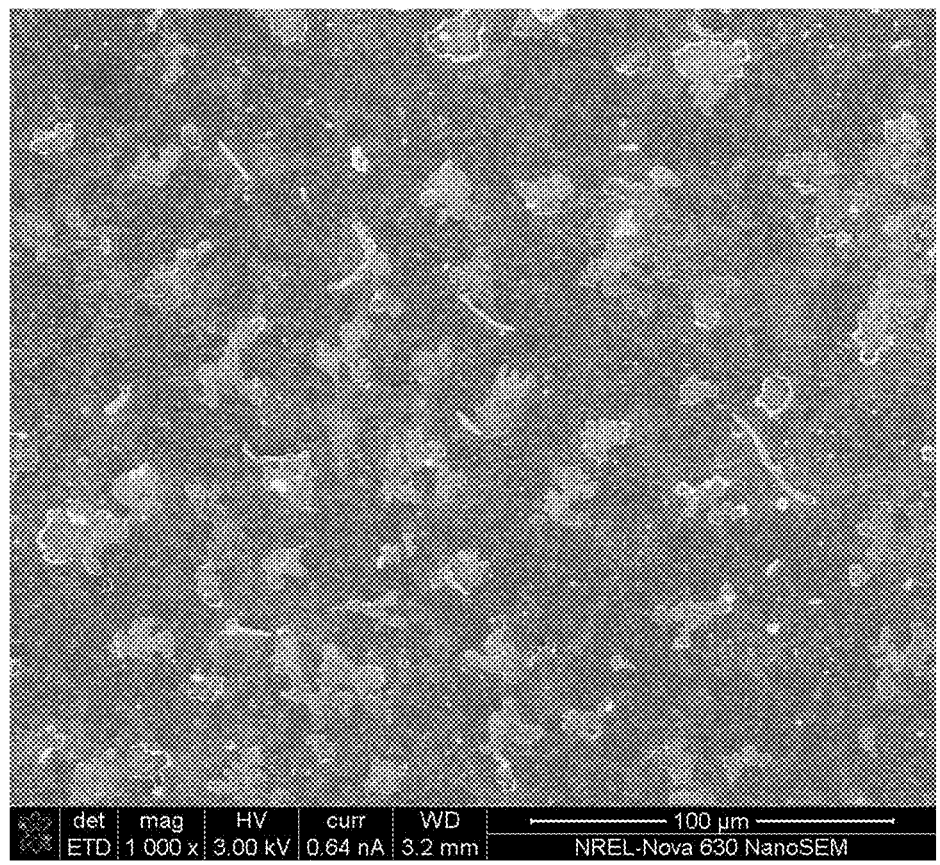
Figure 10B:
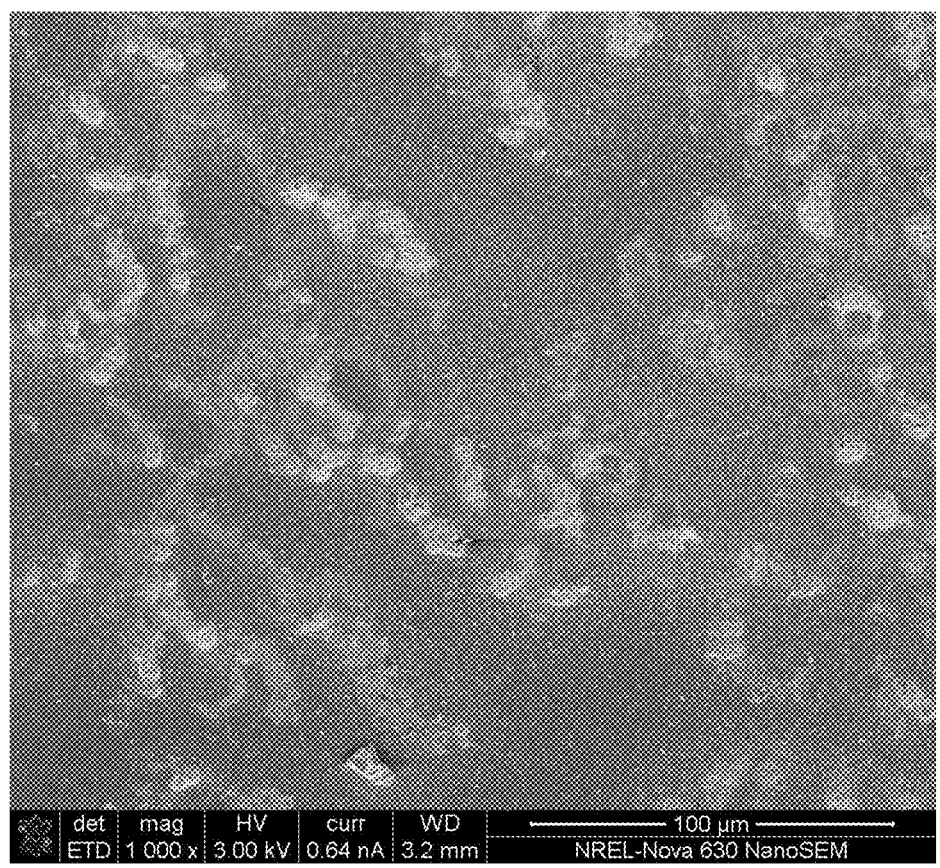

FIGS. 10A and 10B illustrate scanning electron microscopy images of (FIG. 10A) unfunctionalized metallic $MoS_2$, and (FIG. 10B) $Et_2NPH$ functionalized metallic $MoS_2$, according to some embodiments of the present disclosure. The nanosheets are deposited on a Si wafer.

Figure 11:
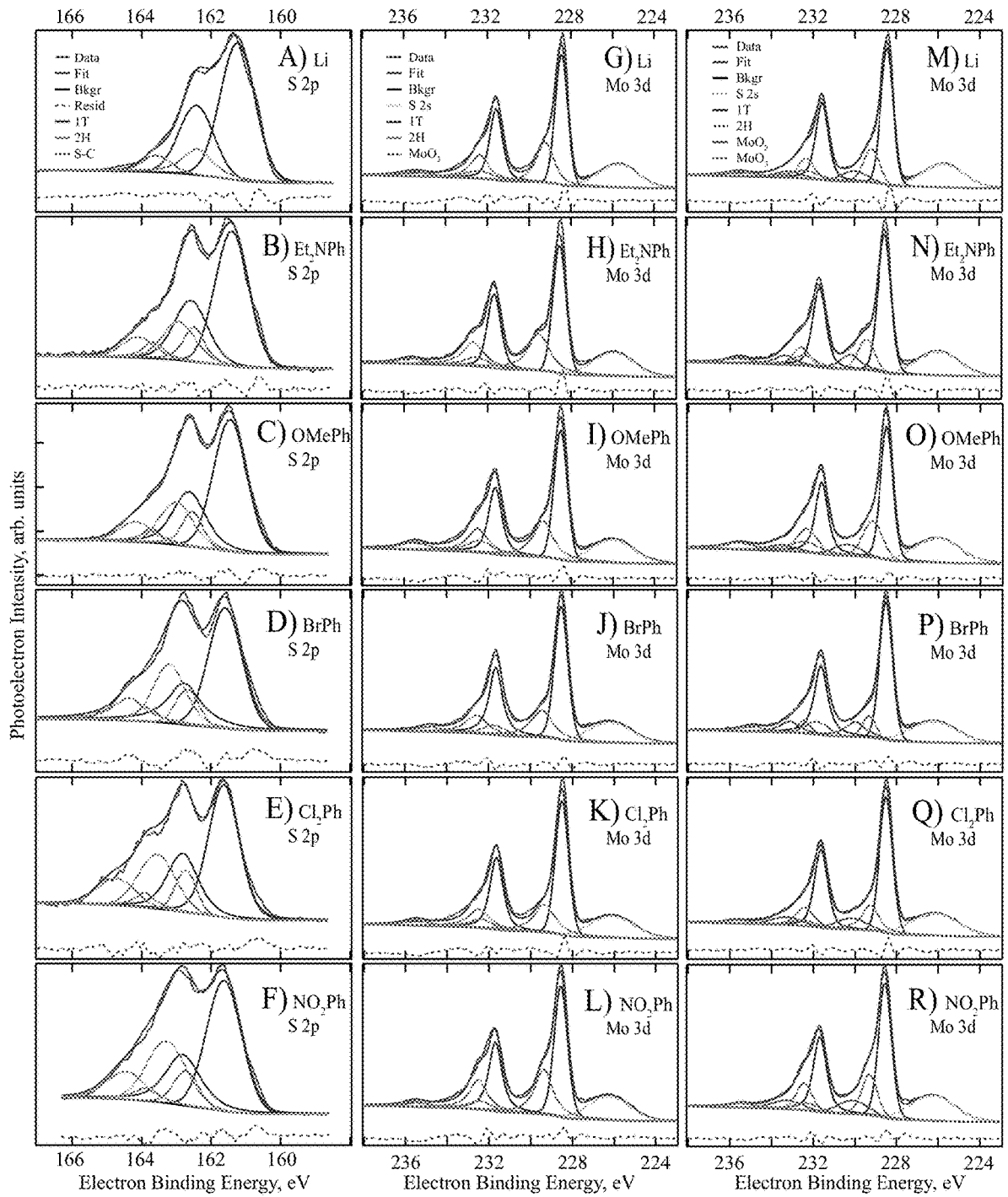

FIG. 11 illustrates fits to XPS spectra of unfunctionalized metallic $MoS_2$ (Panels A, G, and M), $Et_2NPh$ functionalized metallic $MoS_2$ (Panels B, H, and N), OMePh functionalized metallic $MoS_2$ (Panels C, I, and O), BrPh functionalized metallic $MoS_2$ (Panels D, J, and P), $Cl_2Ph$ functionalized metallic $MoS_2$ (Panels E, K, and Q), and $NO_2Ph$ functionalized metallic $MoS_2$ (Panels F, L, and R). The S 2p spectra (Panels A-F) show differences between the metallic and functionalized $MoS_2$ due to a S—C bond. There is little difference in the Mo 3d spectra (Panels G-R) because the Mo does not participate in the bonding of the functional group. Panels G-L do not include $MoO_2$ in the fits while Panels M-R do include $MoO_2$ in the fits. The dashed traces are the residuals from the fits.

Figure 12:
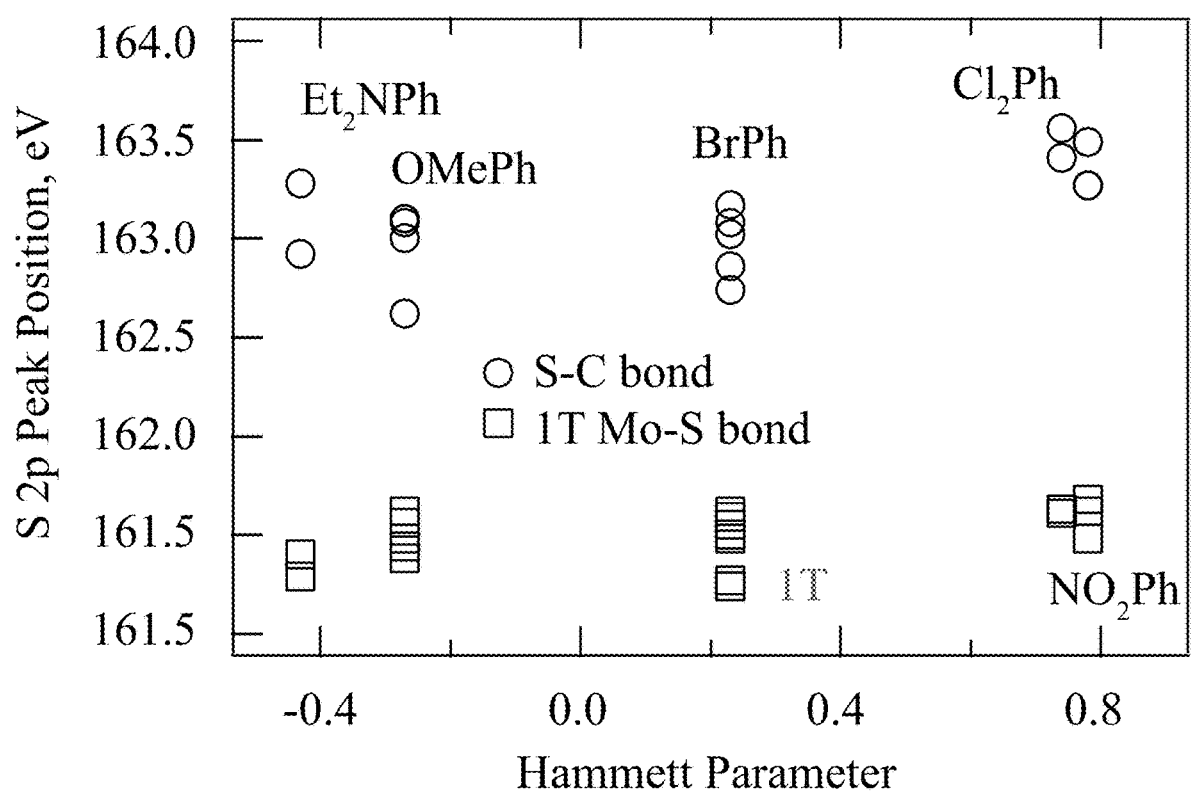

FIG. 12 illustrates S $2p_{3/2}$ peak positions for metallic Mo—S bonds (~161.5 eV, squares) and S—C bonds (~163 eV, circles) plotted against the Hammett parameter. Unfunctionalized $MoS_2$ was estimated to have a Hammett parameter of 0.23 from the DRIFTS data.

Figure 13A:
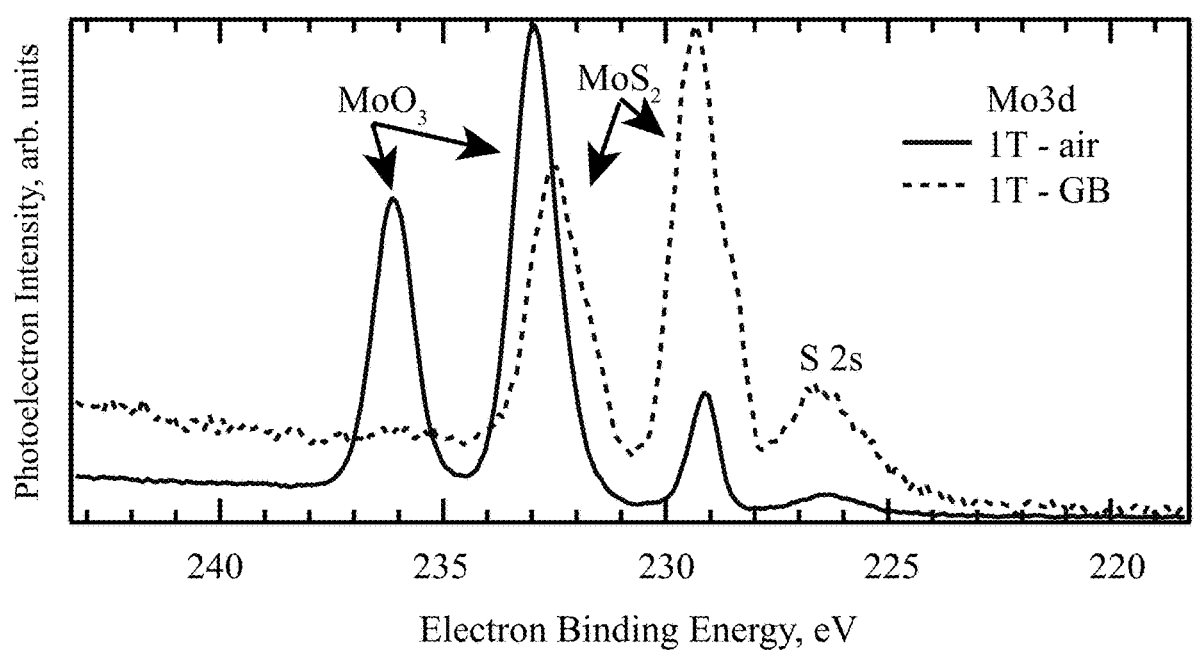
Figure 13B:
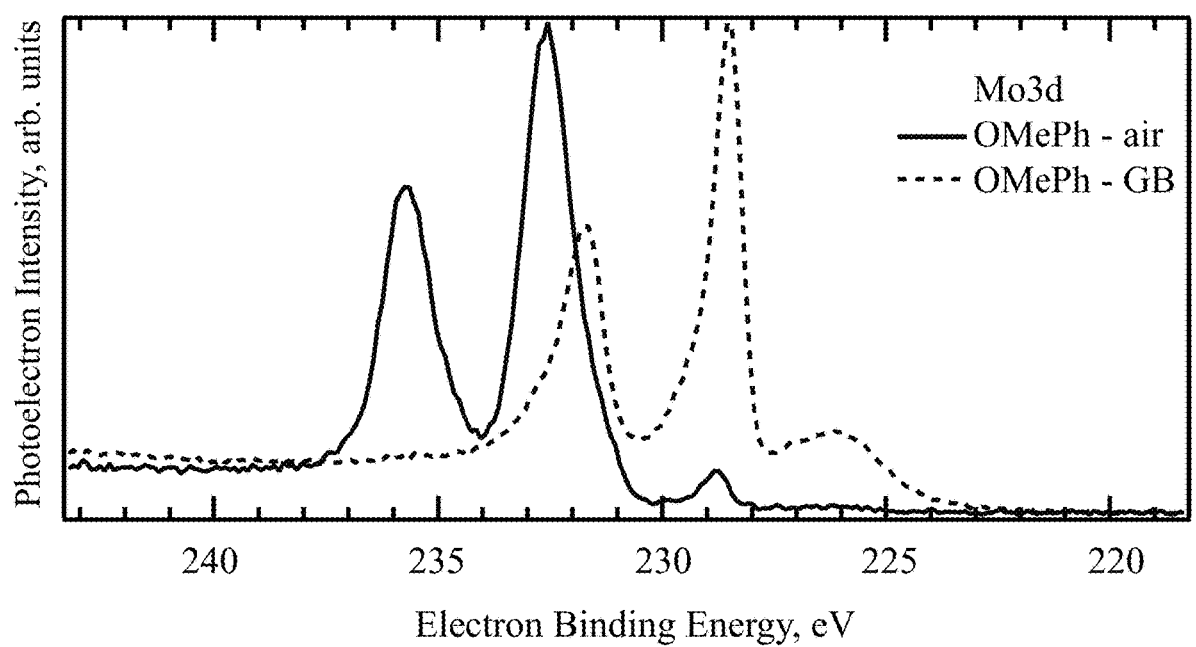
Figure 13C:
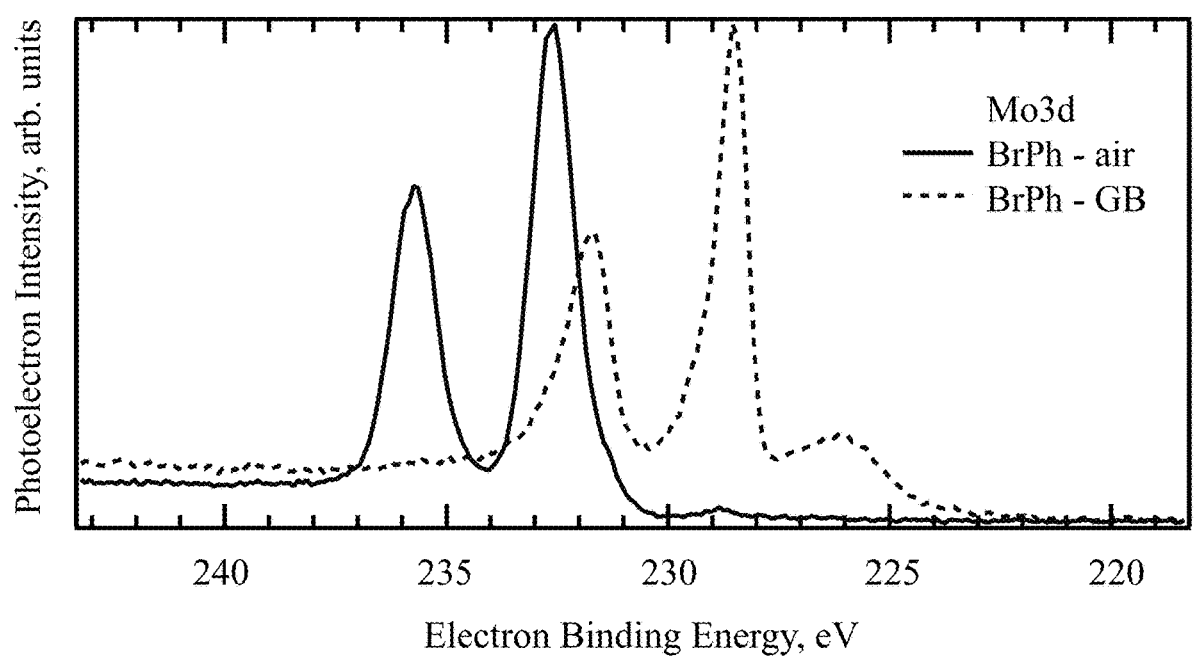
Figure 14A:
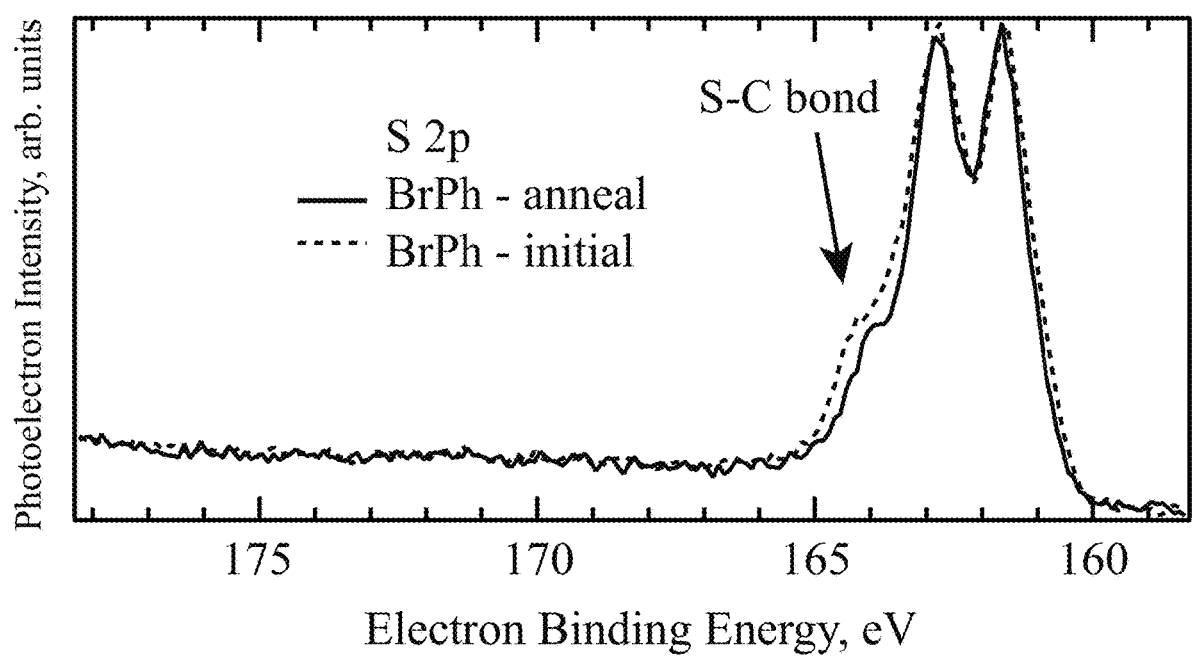
Figure 14B:
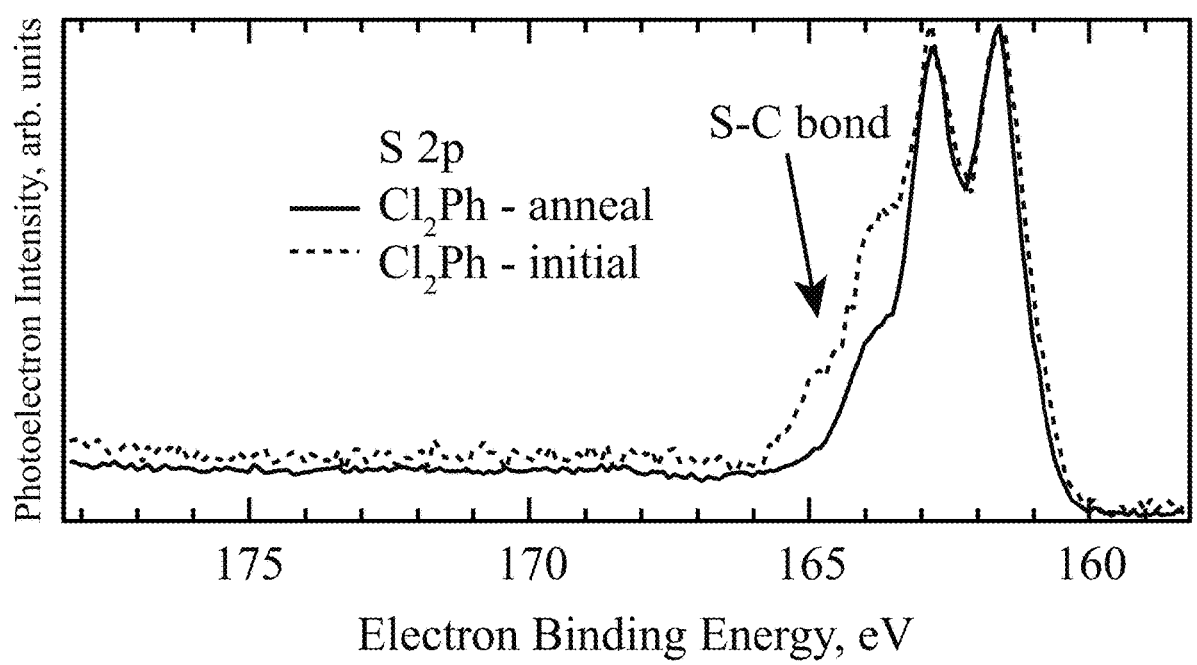
Figure 14C:
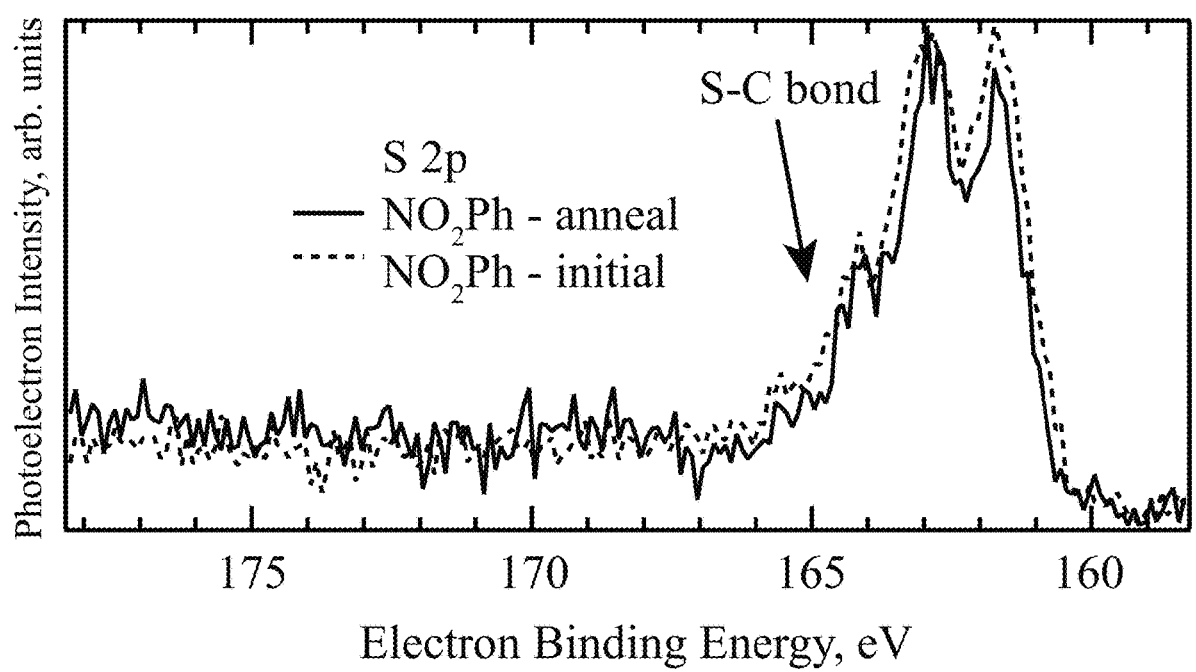
Figure 14D:
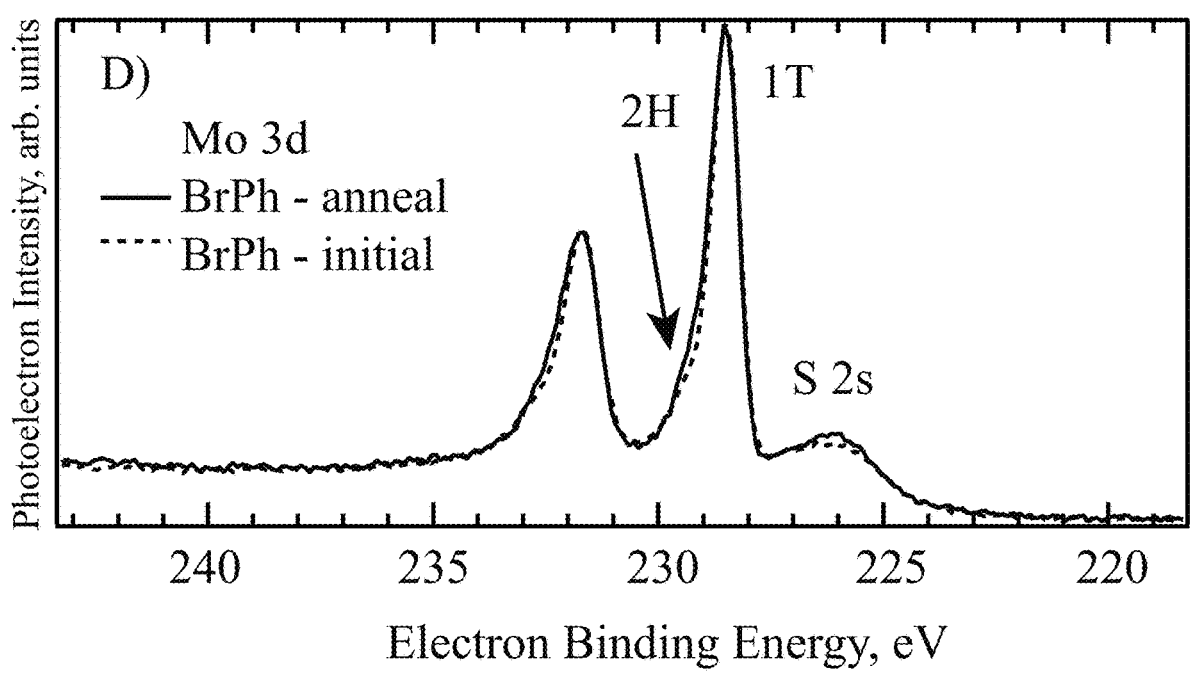
Figure 14E:
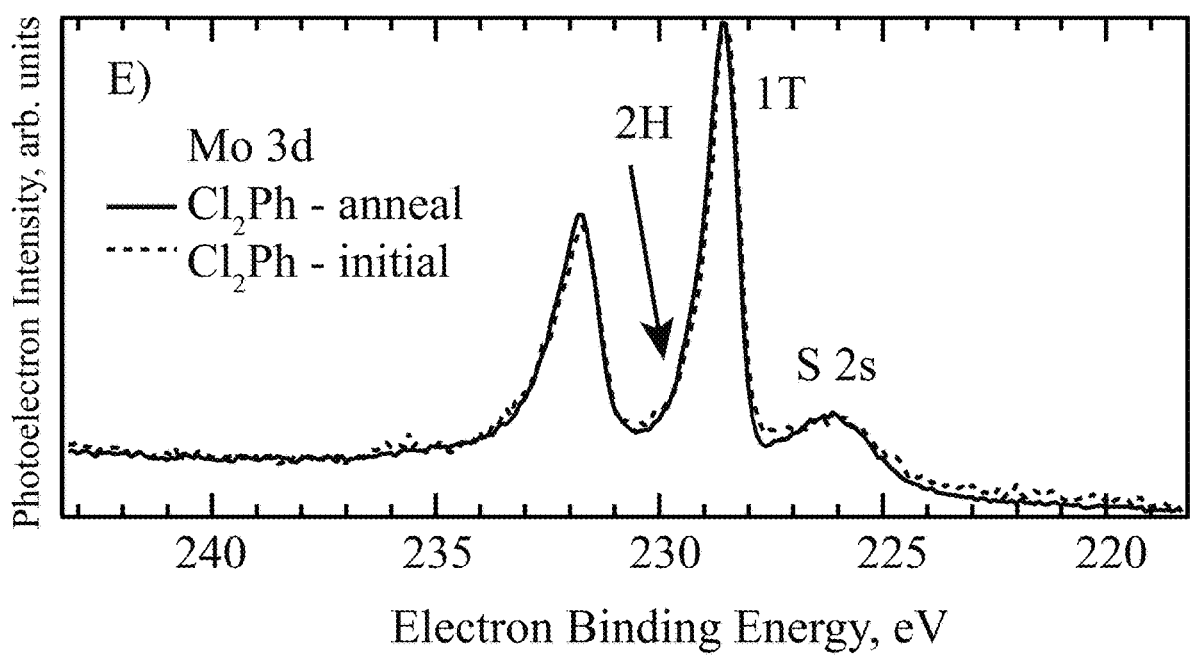
Figure 14F:
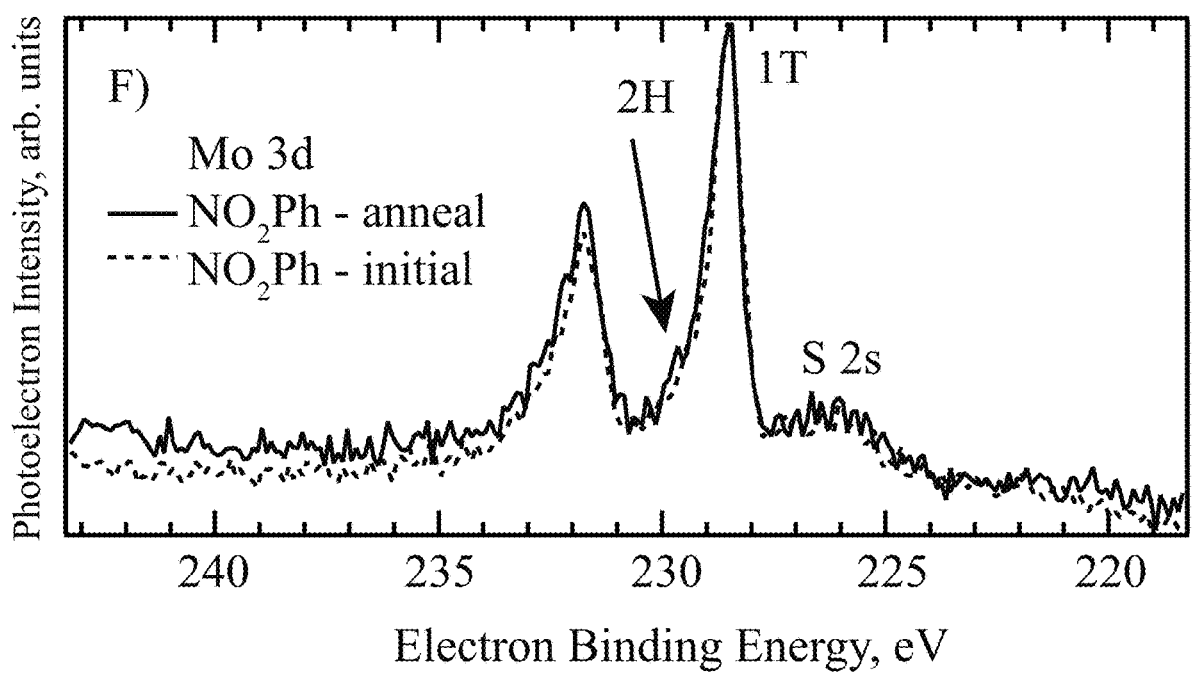

FIGS. 13A-13C illustrate XPS spectra unfunctionalized metallic $MoS_2$ nanosheets (FIG. 13A), OMePh functionalized metallic $MoS_2$ nanosheets (FIG. 13B), and BrPh functionalized metallic $MoS_2$ nanosheets (FIG. 13C) annealed in air at 150° C. for 24 hours, according to some embodiments of the present disclosure. The films decomposed into $MoO_3$.

FIGS. 14A-14F illustrate XPS spectra of S 2p (FIGS. 14A-14C) and Mo 3d (FIGS. 14D-14F) spectra before (dashed trace) and after annealing (solid trace) for BrPh functionalized $MoS_2$ nanosheets (FIGS. 14A and 14D), $Cl_2Ph$ functionalized $MoS_2$ nanosheets (FIGS. 14B and 14E), and $NO_2Ph$ functionalized $MoS_2$ nanosheets (FIGS. 14C and 14F), according to some embodiments of the present disclosure. The nanosheets were annealed in a $N_2$ atmosphere for 24 hours at 150° C. The functional groups protected the $MoS_2$ from undergoing conversion from the metallic to the semiconducting state.

Figure 15:
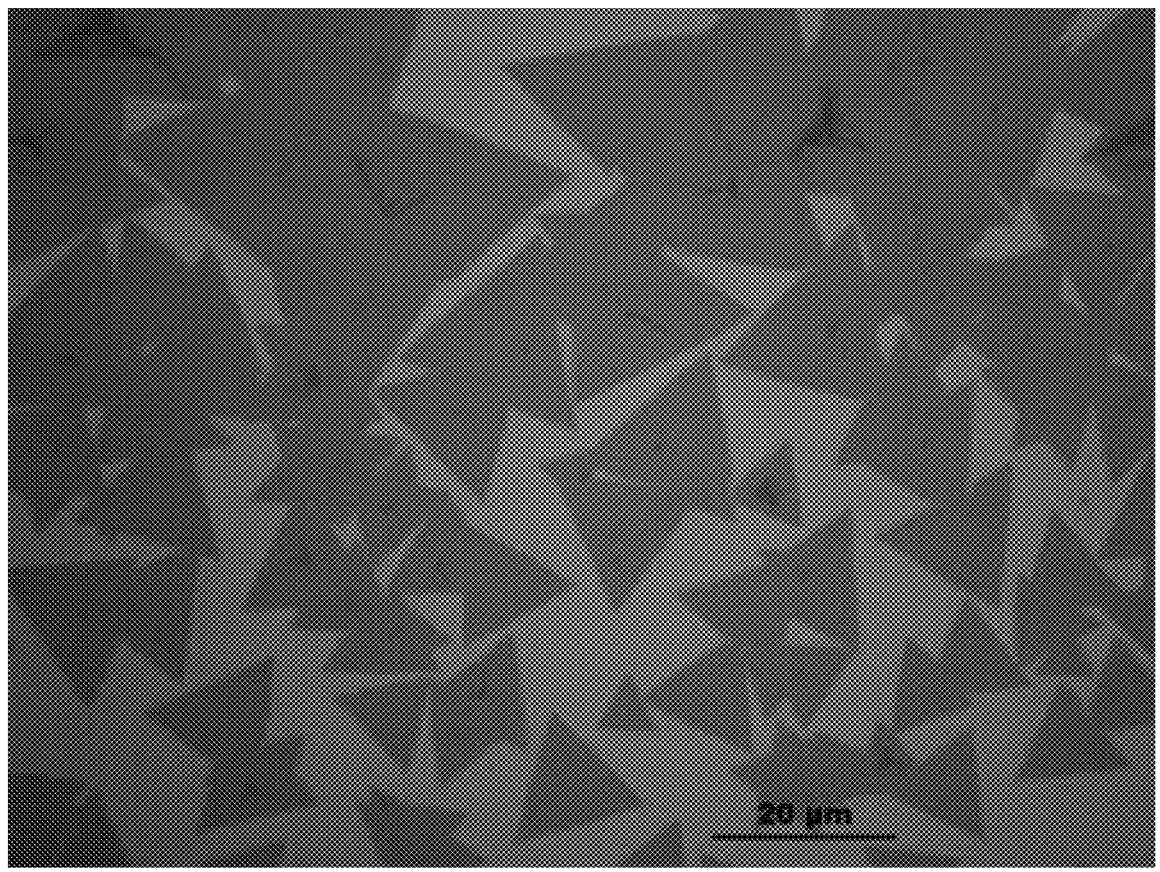

FIG. 15 illustrates an optical microscopy image of monolayer $MoS_2$ flakes synthesized by chemical vapor deposition (CVD) with a characteristic length of up to about 50 m and having a thickness of about 0.8 nm, according to some embodiments of the present disclosure.

DETAILED DESCRIPTION

The present disclosure may address one or more of the problems and deficiencies of the prior art discussed above. However, it is contemplated that some embodiments as disclosed herein may prove useful in addressing other problems and deficiencies in a number of technical areas.

Therefore, the embodiments described herein should not necessarily be construed as limited to addressing any of the particular problems or deficiencies discussed herein.

The present disclosure relates to metal chalcogenides, for example molybdenum disulfide ($MoS_2$), functionalized with ligands, where further examples of metal chalcogenides include transition metal chalcogenides such as $WSe_2$, $MoS_2$, $WS_2$, $MoSe_2$, $WTe_2$, and $MoTe_2$. In some embodiments of the present disclosure, as shown herein, functionalizing nanosheets and/or nanoparticles of transition metal chalcogenides provides a synthetic chemical route for controlling the electronic properties and stability within traditionally thermally unstable metallic states. In some embodiments of the present disclosure, and as shown herein, the fundamental electronic properties of metallic (1 T phase) nanosheets of $MoS_2$ may be modified through functionalization with ligands by covalent bonds, resulting in the direct influence of the modified $MoS_2$ catalyst on the kinetics of the hydrogen evolution reaction (HER), surface energetics of the catalyst, and stability of the catalyst. Metal chalcogenides, as defined herein, have a composition defined by $MX_z$, where z is between 1 and 3, inclusively. M may include at least one of Sc, Zr, Hf, Zr, Ti, Nb, Ta, V, Mo, Cr, Re, W, S, Pt, Fe, Cu, Sb, In, Zn, Cd, P, and/or Mn. X may include at least one of S, Se, and/or Te. Examples of metal chalcogenides include $ScS_2$, $ScSe_2$, $SeTe_2$, $ZrS_2$, $ZrSe_2$, $HfS_2$, $HFSe_2$, $HfS_3$, $HfSe_3$, $ZrS_3$, $ZrSe_3$, $ZrTe_3$, $TiS_2$, $TiS_3$, $TiSe_3$, $NbS_2$, $NbSe_2$, $NbS_3$, $TaS_2$, $TaSe_2$, $TaS_3$, $TaSe_3$, $VS_2$, $VSe_2$, $MoReS_2$, $CrS_2$, $WSSe_2$, $MoSSe$, $MoWSe_2$, $MoTe_2$, $WTe_2$, $ReS_2$, $ReSe_2$, $ReNbS_2$, $ReNbSe_2$, $PtS_2$, $PtSe_2$, $PtTe_2$, $FeSe$, $CuS$, $CuSbS_2$, $CuInS_2$, $CuInSe_2$, $ZnS$, $ZnSe$, $CdS$, $CdSe$, $FePS_3$, $FePSe_3$, $MnPS_3$, $MnPSe_3$, $CdPS_3$, and/or $CdPSe_3$. As shown herein, at least one of these metal chalcogenides may be functionalized with at least one ligand by a covalent bond. In some embodiments of the present disclosure, a metal chalcogenide that includes at least one of $MoReS_2$, $CrS_2$, $WSSe_2$, $MoSSe$, $MoWSe_2$, $MoTe_2$, and/or $WTe_2$ may be functionalized with at least one ligand by a covalent bond.

As used herein, the term "substantially" indicates a state and/or condition that is for the most part only one state and/or conditions. For example, a state and/or condition that is "substantially A", may be 100% in state and/or condition A. However, a state and/or condition that is "substantially A" may contain some small amounts of B, for example within the limits of detection of the analytical method used to detect A, or within the limits of a separation method used to separate A from B. For example, a metal chalcogenide may be substantially in the 1 T metallic crystalline phase, meaning the metal chalcogenide may be 100% in the 1 T phase or at some value less than 100%; e.g. greater than 95%, greater than 99%, and/or greater than 99.9%.

In some embodiments of the present disclosure, chemically-exfoliated and/or CVD grown, metallic $MoS_2$ nanosheets may be functionalized with ligands containing electron donating and/or electron withdrawing groups, containing organic phenyl rings, where a phenyl ring is abbreviated herein as Ph. Functionalization of the metal chalcogenides, for example $MoS_2$, with ligands results in the ability to manipulate the electrochemical properties and stability of the metallic $MoS_2$. It was determined that $MoS_2$ functionalized with the most electron donating ligand, p-$(CH_3CH_2)_2$NPh, was the most efficient catalyst for HER of the ligands tested, with initial activity similar to the pristine metallic phase of $MoS_2$. The p-$(CH_3CH_2)_2$NPh-$MoS_2$ catalyst was shown to be more stable than unfunctionalized metallic $MoS_2$ and outperformed unfunctionalized metallic $MoS_2$ for continuous $H_2$ evolution within 10 minutes under the same conditions.

As shown herein, testing of $MoS_2$ as the metal chalcogenide in the form of a nanosheet, functionalized with various ligands, the overpotential and the Tafel slope for catalytic HER both correlated directly with the electron donating strength (Hammett parameter) of the pendant group on the ligand, in this case a phenyl ring. The results are consistent with a mechanism involving ground-state electron donation or withdrawal to/from the $MoS_2$ nanosheets, which modifies the electron transfer kinetics and catalytic activity of the $MoS_2$ nanosheets. In addition, the ligands tuned the work function of the metallic $MoS_2$ surface over a range of 800 mV. The work function correlated with HER activity, and the shallowest work function resulted in the highest activity for proton reduction. The ligands preserved the metallic feature of the $MoS_2$ nanosheets, inhibiting conversion to the thermodynamically stable semiconducting state (2H) when annealed at 150° C. for 24 hours in an inert atmosphere. This protection is critical to maintaining the catalytically active state of a metal chalcogenide catalyst; e.g. metallic $MoS_2$ nanosheets. Thus, without wishing to be bound by theory, it is proposed herein that the electron density and, therefore, reactivity of the metal chalcogenide HER catalysts may be controlled by functionalizing the catalysts with the appropriate electron withdrawing and/or electron donating ligands.

In some embodiments of the present disclosure, metallic $MoS_2$ nanosheets were modified with a series of substituted phenyldiazonium salts wherein the ligands (e.g. phenyl groups) formed S—C bonds between the ligands and the $MoS_2$ nanosheets. X-ray photoelectron spectroscopy (XPS) was used to verify the functionalization of the metallic $MoS_2$ and to measure the work function of the modified surfaces. HER studies were completed to determine the influence of the modified surfaces of the functionalized metal chalcogenide catalysts, e.g. functionalized $MoS_2$, on the HER kinetics. The stability of the functionalized metallic $MoS_2$, for both monolayer and multilayer sheets, was quantified by measuring the chemical environment (XPS) and HER activity before and after annealing (e.g. treating at elevated temperatures in a controlled $N_2$ environment); functionalization of the metallic sheets resulted in improved stability. The stability of both functionalized and unfunctionalized $MoS_2$ was further explored during continuous HER catalysis over a two-hour period of time. This work demonstrates that ligands provided increased stability for the catalytically active metallic phase of the $MoS_2$ nanosheets tested and that varying the ligands from electron withdrawing to electron donating groups directly influences the electronic properties and the HER catalytic reactivity of $MoS_2$ nanosheets.

Synthesis and Characterization:

Functionalized metallic $MoS_2$ nanosheets were synthesized following the procedure developed by Knirsch (ACS Nano 2015, 9, 6018). Briefly, bulk semiconducting $MoS_2$ was solution-exfoliated via intercalation with n-butyl lithium (n-BuLi) and a subsequent reaction with water produced $MoS_2$ nanosheets that were primarily in the metallic crystalline phase. After centrifugation/purification of these metallic nanosheets, they were reacted with a series of five diazonium salts (in separate reactions) to form the corresponding functionalized $MoS_2$ nanosheets. Throughout the remainder of this disclosure p-$NO_2$Ph-$MoS_2$, 3,5—$Cl_2$Ph-$MoS_2$, p-BrPh-$MoS_2$, p-$OCH_3$Ph-$MoS_2$, and p-$(CH_3CH_2)_2$NPh-$MoS_2$ are referred to as $NO_2$Ph, $Cl_2$Ph, BrPh, OMePh, and Et$_2$NPh, respectively, and the pristine metallic MoS$_2$ nanosheets as 1 T. Note that when appropriate, the as-purchased semiconducting crystalline phase of the MoS$_2$ powder is included for comparison and is referred to as bulk (2H). The five organic ligands tested each have a phenyl ring substituted with various moieties that are either electron donating or withdrawing (see FIG. 1A). This resulted in a range of electron donating/withdrawing properties of the ligands due to the ligands possessing a range of Hammett parameters, which are correlated to their dipole moments. The more negative the Hammett parameter, the more electron donating the moiety is to the phenyl ring and concomitantly to the MoS$_2$ surface. Et$_2$NPh possesses the most electron-donating moiety (e.g. Et$_2$N) and has a corresponding Hammett parameter of −0.43. Conversely, more positive Hammett parameters correspond to more electron withdrawing moieties, with the ligand NO$_2$Ph (having the NO$_2$ moiety) having the largest Hammett parameter of +0.78.

In some embodiments of the present disclosure, a nanocrystal and/or nanosheet composition may include a ligand covalently bound to a metal chalcogenide where the ligand may have at least one moiety such as at least one of a halogen, an amine, an amide, a ketone, thiol, and/or a nitro group. Examples of a halogen include fluorine, chlorine, bromine, iodine, and astatine. Examples of amines include at least one of methylamine, ethylamine, dimethylamine, and/or aniline. Examples of amides include at least one of acetamide, dimethylacetamide, a phosphonamide, and/or a sulfonamide. Examples of ketones include at least one of acetone, acetylacetone, and/or methyl ethyl ketone. Examples of thiol groups include at least one of ethanedithiol and/or methanethiol. Examples of nitro groups include at least one of nitromethane, nitrotoluene, and/or nitrobenzene. A moiety may be directly bound to at least one of the metal and/or to the chalcogenide of the metal chalcogenide. In some embodiments of the present disclosure, the ligand may include at least one intermediate group positioned between the moiety and the metal chalcogenide. Examples of an intermediate group include at least one of an aromatic group, a saturated hydrocarbon chain, and/or an unsaturated hydrocarbon chain. Examples of an aromatic group that include a phenyl ring include at least one of anthracene and/or bipyridine. Examples of other potentially suitable ligands include at least one of pyridine, pyrazine, imidazole, and/or anthracene.

The MoS$_2$ nanosheets were characterized with atomic force microscopy (AFM), scanning electron microscopy (SEM), and Raman spectroscopy. The metallic MoS$_2$ nanosheets were not monodisperse in lateral size or layer number. FIG. 1B illustrates AFM images of three MoS$_2$ nanosheets that were solution deposited onto a silicon substrate and are representative of the nanosheets described herein (e.g. having thicknesses between of 3 nm and 5 nm and characteristic lengths between 250 nm and 400 nm). The corresponding height profiles are shown in FIG. 1C.

In addition, FIG. 15 illustrates an optical microscopy image of monolayer MoS$_2$ flakes synthesized by chemical vapor deposition (CVD) with a characteristic length of up to about 50 m and having a thickness of about 0.8 nm, according to some embodiments of the present disclosure. To gain additional morphology information, metallic and Et$_2$NPh MoS$_2$ were measured with SEM (see FIGS. 10A and 10B); obvious changes to the morphology after functionalization are not evident. In addition, metallic and functionalized MoS$_2$ nanosheets were characterized with Raman, using an excitation wavelength of 633 nm (see FIG. 2A). All MoS$_2$ spectra contained the expected transitions at ~383 cm$^{-1}$ (E$^1_{2g}$) and ~406 cm$^{-1}$ (A$_{1g}$). The Raman spectrum of the metallic MoS$_2$ has distinct features at 154, 230, and 326 cm$^{-1}$, which correspond to the J$_1$, J$_2$, and J$_3$ modes, respectively. The functionalized MoS$_2$ samples also have J$_1$ and J$_2$ peaks, whereas the J$_3$ peak is not observed with appreciable signal-to-noise, indicating that the functionalized MoS$_2$ mainly remained in the metallic phase.

The chemical environments of functionalized and bare MoS$_2$ were quantified by diffuse reflectance infrared Fourier transform spectroscopy (DRIFTS), XPS, and combustion analysis. DRIFTS spectra (see FIG. 2B) confirmed the presence of the phenyl ring-containing ligands in all functionalized MoS$_2$ nanosheets except for the Et$_2$NPh ligand sample, which was not measured. The NO$_2$Ph ligand spectrum shows characteristic asymmetric (1518 cm$^{-1}$) and symmetric (1342 cm$^{-1}$) stretches for the NO$_2$ moiety, along with the NO$_2$ scissor mode at 853 cm$^{-1}$. The OMePh ligand spectrum shows symmetric (1463 cm$^{-1}$) and asymmetric (1440 cm$^{-1}$) stretches for the OMe moiety, along with Ph-O (1291 cm$^{-1}$ and 1250 cm$^{-1}$) and PhO—CH$_3$ (1025 cm$^{-1}$) stretches as well as the O—CH$_3$ rocking mode (1180 cm$^{-1}$).

The DRIFTS data (see FIG. 2B) also provide a measurement of the polar interaction between the MoS$_2$ and the phenyl ring of the ligands. The phenyl ring has four characteristic modes, split into two quadrant deformations around 1550-1600 cm$^{-1}$ and two semicircle deformations around 1450-1500 cm$^{-1}$. The higher-energy semicircle deformation around 1500 cm$^{-1}$ is only IR active when the phenyl ring has an electron donating group on it. This is consistent with the presence of a strong feature at 1492 cm$^{-1}$ in the OMePh ligand spectrum, but the lack of a higher energy peak in the BrPh ligand spectrum and the Cl$_2$Ph ligand spectrum (such a feature would likely be obscured by the NO$_2$ moiety asymmetric peak in the NO$_2$Ph ligand spectrum). In addition, the quadrant stretch modes are IR inactive for para-substituted phenyl rings where the substituents have identical electron donating or withdrawing character, maintaining a mirror of symmetry. Interestingly, the BrPh ligand spectrum shows almost no quadrant stretching, despite the fact that the para substituents are Br and MoS$_2$. This indicates that the MoS$_2$ contributes a similar amount of electron density to the phenyl ring as the Br group and has a similar Hammett parameter of around 0.23. In support of this analysis, the quadrant stretches on the other three phenyl groups behave as expected: the OMePh ligand spectrum shows the normal intensity ratio where the higher energy peak at 1594 cm$^{-1}$ is more intense than the peak at 1570 cm$^{-1}$; the Cl$_2$Ph ligand spectrum shows an inverted intensity ratio for its peaks due to extending resonance to the two Cl moieties (1562 cm$^{-1}$ peak is more intense than the 1591 cm$^{-1}$ peak); and the NO$_2$Ph ligand spectrum shows roughly equal intensity of the 1598 cm$^{-1}$ and 1576 cm$^{-1}$ peaks due to its less complete resonance with the phenyl ring.

XPS was utilized to determine the atomic compositions of the MoS$_2$, percentage of MoS$_2$ that was in the metallic phase, and the work function of the different films. The Mo 3d and S 2p core-level XPS results for the modified and unmodified MoS$_2$ are shown in FIGS. 3A and 3B. These XPS measurements on both the modified and unmodified MoS$_2$ nanosheets show that the concentration of C and O impurities was low. For each of the modified nanosheets, the atomic species expected for each moiety for each corresponding ligand was observed (N for Et$_2$NPh and NO$_2$Ph, Br for BrPh, and Cl for Cl$_2$Ph, data not shown). In the case of the OMePh ligand, there is not a unique atom, DRIFTS confirms functionalization for this functional group. Table 1 highlights the S:Mo and S:X ratio, where X is the unique atom for that functional group. The ratios were determined from multiple XPS measurements. The S:Mo ratios are close to the expected value of 2. The S:X ratios vary between samples due to differences in ligand coverage on the $MoS_2$ from batch to batch and the degree to which the ligand readily attaches to the $MoS_2$ nanosheets; therefore, only X was used as a qualitative confirmation of the presence of the ligands.

TABLE 1

The XPS atomic ratios (S:Mo and S:X), % of $MoS_2$ that is metallic (% 1T), and workfunction ($\phi$) energies for the modified and unmodified metallic $MoS_2$ nanosheets.

| $MoS_2$ | S:Mo | S:X[a] | % 1T[b] | $\phi$, eV[c] |
|---|---|---|---|---|
| 1T | 2.0 | NA | 81 | 3.81 |
| $Et_2NPh$ | 2.6 | 2.3 | 81 | 4.06 |
| OMePh | 2.2 | NA | 78 | 4.25 |
| BrPh | 2.1 | 2.4 | 82 | 4.75 |
| $Cl_2Ph$ | 2.6 | 0.4 | 84 | 4.85 |
| $NO_2Ph$ | 2.2 | 1.8 | 76 | 4.68 |

[a]X is the unique atom of the functional group, e.g. X = Cl for $Cl_2Ph$.
[b]The % 1T is taken from Mo 3d fits, where $MoO_2$ is included. See SI for more details. Estimated standard deviation of +/- 8%.
[c]The energy uncertainty for $\phi$ is +/- 25 meV.

In addition to the XPS results, elemental analysis measurements were completed to give relative quantities between $Et_2NPh$ ligands and $NO_2Ph$ ligands. For the CHN combustion analysis (see below), dried powders of the $Et_2NPh$ and $NO_2Ph$ $MoS_2$ nanosheets were used. This elemental analysis confirms the presence of N in both powders (see Table 2). However, the relative amount of CHN, per mole of $MoS_2$, was reduced in the $Et_2NPh$ compared to the $NO_2Ph$ powder. This result verifies a lower ligand coverage on $MoS_2$ for the $Et_2NPh$ ligand compared to $NO_2Ph$ ligand and is consistent with the XPS S 2p results (see FIG. 3C).

TABLE 2

CHN analysis of N containing functionalized $MoS_2$ Samples.

| | Mass % | | | Expected | | | Found | | |
|---|---|---|---|---|---|---|---|---|---|
| | C | H | N | C | H | N | C | H | N |
| $NO_2Ph$ | 35.87 | 2.00 | 8.38 | 6 | 4 | 1 | 6.00 | 3.98 | 1.20 |
| $Et_2NPh$ | 18.02 | 2.20 | 2.55 | 10 | 14 | 1 | 10.00 | 14.52 | 1.21 |

In FIG. 3B, the XPS spectra of S 2p confirms the presence of S—C bonding for the functionalized $MoS_2$. The metallic $MoS_2$ spectrum clearly shows the S 2p spin orbit splitting of the metallic state (and a small contribution from the 2H state). The functionalized $MoS_2$ nanosheets have additional features at higher binding energy (162.5-165 eV), which are consistent with a S—C bond. The observation of this S—C bond gives additional evidence that the OMePh-$MoS_2$ sample is functionalized, since there is not a unique atom to identify the functional group with XPS. The functionalized $MoS_2$ nanosheets with electron withdrawing ligands ($NO_2Ph$, $Cl_2Ph$, and BrPh) have more intensity in the S—C region than the electron donating groups (see FIG. 3B). This suggests that the electron withdrawing groups have greater functional group coverage on the $MoS_2$ than the electron donating groups and is consistent with the CHN combustion analysis. Fits to the core level XPS spectra are shown in FIG. 11, Panels A-R. FIG. 3C plots the ratio of the areas of the 1 T Mo—S bond to the S—C bond. It is clear from FIG. 3C that the more electron withdrawing ligands have greater coverage on the $MoS_2$ than the more electron donating ligands. Mechanistically, the electron withdrawing ligands readily functionalize the negatively charged metallic $MoS_2$ nanosheets compared to the electron donating ligands; the degree of functionalization depends, at least partly, on the balance of nanosheet charge density and the ligands neutralizing the charge.

The S 2p peak positions of the S—C and metallic Mo—S bonds are consistent between the different functionalized nanosheets and do not have a dependence on Hammett parameter (see FIG. 12). High-resolution XPS core level measurements are sensitive to changes in the local atomic environment and are reported with respect to the Fermi level (i.e., electron binding energy). As expected, the functionalized $MoS_2$ nanosheets have an additional S peak because of the new bond formed between the $MoS_2$ and the ligand. This appears at higher binding energy with respect to the Mo—S bond. As for the S—C bond peak position, this does not change with ligand because the local atomic environment is the same (specifically, the S oxidation state is the same) and the Fermi level to core level energy difference is not changing with ligand.

The Mo 3d peaks (see FIG. 3A) also give detailed information about the chemical environment. Like S 2p, Mo 3d also has a spin orbit splitting (3.13 eV). The Mo 3d peak contains contributions from $MoS_2$, $MoO_3$, and $MoO_2$. For the S:Mo ratio, only the integrated Mo 3d area associated with $MoS_2$ was used (fits to the spectra are shown in FIG. 11, Panels A-R). From individual fits of the spectra, the percentage of $MoS_2$ in the metallic phase was quantified, which is ~80% (see Table 1 above). Importantly, FIG. 3B demonstrates that the ligands do not change the Mo 3d features and the Mo environment remains the same. This again verifies that the ligands are bonding to the S and not to the Mo of the $MoS_2$ nanosheets.

Surface Energetics

To determine the degree to which the ligands influenced $MoS_2$ surface energetics, XPS was used to measure the work function (difference between the vacuum and Fermi levels). Table 1 above lists the average work function for the functionalized $MoS_2$ samples, where between 2 films and 5 films from separate reactions were measured for each ligand. There is a clear trend in how the work function varied with chemical functionalization (see FIG. 4); as the Hammett parameter increases (more electron withdrawing), the work function at the surface increases (requires more energy to remove an electron from the surface, deeper work function).

Although there is some variation in the work function measurements of each sample type, due to differences in the amount of ligand per $MoS_2$, there is a positive correlation between the work function and Hammett parameter, with a large change of approximately 800 meV across the entire series. These differences in surface energetics in turn influence the HER activity of the $MoS_2$ nanosheets, which is discussed below.

HER Activity

To determine the effects of functionalization of metal chalcogenides on HER, drop-cast dispersions of modified $MoS_2$ onto freshly polished glassy carbon electrodes were performed to acquire linear sweep voltammograms (LSVs) (see FIGS. 5A and 5B). Typically, LSVs are used to determine the overpotential, Tafel slope, and current density of an electrochemical reaction of interest. The overpotential is the excess energy above the required thermodynamic potential in order to achieve a particular rate for hydrogen evolution. The Tafel slope is related to the kinetic rate and exchange current of the electrochemical reaction, and its slope can provide information on rate-determining steps for the reaction. With respect to the HER, it is desirable to minimize the Tafel slope, as this typically reduces the overpotential needed to reach appreciable catalytic current densities and is indicative of facile kinetics.

As the moiety on the phenyl ring was changed from the most electron withdrawing ($Cl_2Ph$, Hammett parameter=0.74) to the most electron donating ($Et_2NPh$, Hammett parameter=-0.43), a systematic shift to lower values in the overpotential and an increase in the catalytic rate towards hydrogen evolution was observed. As the Hammett parameter of the moiety decreased, the overpotential required to achieve 10 mA/cm² catalytic current density decreased from 881 mV for $Cl_2Ph$ to 348 mV for $Et_2NPh$. This ~500 mV shift was accompanied by a decrease in the Tafel slope from 213 mV/dec to 75 mV/dec. A tabulation of the electrochemical parameters can be found in Table 3. The Tafel slope of the most electron donating ligand ($Et_2NPh$) is similar to metallic $MoS_2$; however, the more electron withdrawing groups perform worse than bulk 2H (e.g. semiconductor phase) $MoS_2$. This correlation between the ligands and the $MoS_2$ catalyst HER activity gives insight into the mechanism by which the ligands and/or moieties interact with the $MoS_2$ surface.

TABLE 3

Electrochemical parameters with iR corrections for modified, metallic phase, and bulk semiconductor phase $MoS_2$ catalysts. The Tafel slope, exchange current density ($j_0$), and overpotential ($\eta$) at 10 mA/cm² are listed for each of the electrodes.[a]

| | Hammett Parameter[b] | Tafel Slope (mV/dec) | $j_0$ (µA/cm²) | $\eta$, i = 10 mA/cm² (mV) |
|---|---|---|---|---|
| $Cl_2Ph$ | 0.74 | 213 ± 33 | 1.5 ± 1.3 | 881 ± 13 |
| BrPh | 0.23 | 170 ± 7 | 0.4 ± 0.1 | 822 ± 11 |
| OMePh | −0.27 | 136 ± 8 | 1.2 ± 0.4 | 691 ± 23 |
| $Et_2NPh$ | −0.43 | 75 ± 3 | 0.3 ± 0.1 | 348 ± 7 |
| 1T | ~0.23[c] | 61 ± 7 | 1.9 ± 2.5 | 271 ± 36 |
| Bulk (2H) | NA | 186 ± 54 | 1.1 ± 0.7 | 737 ± 46 |

[a]Averages and standard deviations are from three separate electrode preparations.
[b]Values taken from Taft et al.[25]
[c]Estimated equivalent value obtained from DRIFTS data.

FIG. 6 highlights the correlation between Hammett parameter and the activity of the functionalized $MoS_2$ catalysts. As the Hammett parameter is increased, so does the Tafel slope and the overpotential required to reach a catalytic current density of 10 mA/cm². $NO_2Ph$ ligand data are not included in these graphs, as the nitro group was not stable under reductive conditions in acidic solution, presumably forming the ammonium substituted phenyl.

HER Mechanism

Based on the results described herein, and without wishing to be bound by theory, it is proposed herein that electron withdrawing (electrophilic) ligands remove more electron density from the metal chalcogenide nanosheets than the electron donating (nucleophilic) ligands, which ultimately determines the maximum amount of ligands obtainable per $MoS_2$ nanosheet. To further support this HER mechanism, electrochemical impedance spectroscopy (EIS) was completed to probe the electron transfer kinetics at the $MoS_2$/electrolyte interface, as the low frequency region in the EIS can be used to determine the charge transfer resistance of the interface. From the EIS data, the radius of the half circle was used to qualitatively describe the charge transfer resistance (Nyquist plots).

The EIS data (see FIG. 7) illustrate that the $Et_2NPh$ electrode behaved similarly to that of metallic $MoS_2$. As the ligand became more electron withdrawing, the charge transfer resistance of the functionalized $MoS_2$ was larger than the bulk semiconducting phase of $MoS_2$. The EIS and HER electrochemistry results complement each other and support the mechanism that the functional group on metallic $MoS_2$ is either donating electron density or removing electron density from the metal chalcogenide nanosheet, which in turn changed the electron-transfer kinetics and HER activity. When excess charge was present on the $MoS_2$ nanosheets, the metallic phase maintained its high sheet conductance and low charge transfer resistance; conversely, when the excess charge was removed (by electron withdrawing ligands), the sheet conductance was reduced and the charge transfer resistance was increased, making the $Cl_2Ph$ and BrPh $MoS_2$ behave worse than the bulk semiconducting phase for HER. Without wishing to be bound by theory, it is possible that the ligand may block the reactive S site, and as more ligands are present (electron withdrawing groups) the number of active sites may decrease. However, without being bound by theory, it is proposed that the amount of ligand attached to the $MoS_2$ nanosheets may be a balance of $MoS_2$ nanosheet charge and the Hammett parameter.

Stability

Although metallic $MoS_2$ is more catalytically active for HER than bulk semiconducting phase $MoS_2$, the metallic phase is thermodynamically unstable and with time and/or heat and tends to revert back to the semiconducting phase. Understanding how to preserve the metallic state of $MoS_2$ is important to maintaining the catalytic activity of the basal sites. To this end, modified and unmodified $MoS_2$ nanosheets, before and after annealing (e.g. heat treatment), were studied. When samples are annealed at 150° C. for 24 hours under atmospheric condition (e.g. at ~21 mol % oxygen and ~79 mol % nitrogen) the $MoS_2$ underwent conversion to $MoO_3$ and very little $MoS_2$ remained, as determined by XPS core level analysis (see FIGS. 13A-13C). It is evident from the spectra that metallic $MoS_2$ cannot withstand atmospheric conditions at elevated temperatures. However, when the $MoS_2$ nanosheets were annealed in a $N_2$ glovebox at 150° C. for 24 hours, the $MoS_2$ did not convert to $MoO_3$. FIGS. 8A-8F shows the XPS core level data of Mo 3d and S 2p before and after annealing for non-functionalized metallic $MoS_2$, OMePh functionalized $MoS_2$, and $Et_2NPh$ functionalized $MoS_2$. The metallic, non-functionalized $MoS_2$ nanosheet converted from being predominantly in the metallic phase (~80% 1 T) as determined by Mo 3d peak fitting) to a predominance of the semiconducting phase (~75% 2H) under these conditions (see FIGS. 8A and 8D).

In comparison, the XPS data for the functionalized $MoS_2$ nanosheets did not show a change in the Mo 3d and S 2p peaks for OMePh, BrPh, $Cl_2$Ph, and $NO_2$Ph ligands (BrPh, $Cl_2$Ph, and $NO_2$Ph annealed spectra are similar to OMePh and are shown in FIG. 12). The spectra show no appreciable changes after annealing, indicating that the metallic nature of $MoS_2$ was preserved for the functionalized $MoS_2$, relative to unfunctionalized metallic $MoS_2$, for the annealing conditions tested. This result suggests that functionalization through a S—C bond and/or removing some amount of excess charge inhibits conversion back to the semiconducting state of $MoS_2$. The $Et_2$NPh functionalized $MoS_2$ nanosheets did change before and after annealing but to a much smaller degree than the pristine metallic $MoS_2$. This conversion may be due to excess charge remaining on the $MoS_2$ nanosheets following functionalization with the electron donating (nucleophilic) $Et_2$NPh ligand and/or relatively poor coverage of the $MoS_2$ nanosheet by the $Et_2$NPh ligand. The stability provided by functionalization to $MoS_2$ fits with our proposed mechanism by which the functional groups influence the HER mechanism. Specifically, the more electron withdrawing (electrophilic) ligands remove excess charge from the metal chalcogenide nanosheets, while "locking in" the metallic phase. When excess charge remains on the metal chalcogenide sheets, like with $Et_2$NPh ligands, the nanosheets have a lower thermodynamic barrier for the conversion of metallic phase (1 T) to the semiconducting phase (2H).

Two experiments were conducted to test the stability of the functionalized $MoS_2$ under HER conditions. First, the LSVs were measured for both "fresh" electrodes (consistent with those presented in FIG. 5) and electrodes that are annealed at 150° C. for 24 hours under $N_2$ environment (similar to conditions for the data presented in FIGS. 8A-8F). FIG. 9A illustrates the effect of annealing on HER performance and is shown for the $Et_2$NPh ligand-functionalized metallic $MoS_2$ and unfunctionalized metallic $MoS_2$. The unfunctionalized metallic $MoS_2$ degraded significantly and approached that of the bulk, semiconducting phase $MoS_2$ electrode. This result is consistent with the XPS annealing data (see FIGS. 8A and 8D). The $Et_2$NPh functionalized $MoS_2$ electrode was more resilient to this annealing step and degraded only slightly, which is again consistent with the XPS annealing data (see FIGS. 8C and 8F). The functional groups stabilize the underlying $MoS_2$, which prevents the conversion from the normally unstable metallic phase to the normally stable semiconducting phase.

Second, the durability of the $Et_2$NPh functionalized metallic $MoS_2$ and unfunctionalized metallic $MoS_2$ electrodes under HER conditions were studied over a two-hour period (see FIG. 9B), where the overpotential required to maintain 10 mA/cm$^2$ was monitored as a function of time. As can be seen in FIG. 9B, the unfunctionalized metallic $MoS_2$ performance degraded quickly and became worse than the $Et_2$NPh functionalized metallic $MoS_2$ electrode within 7 minutes. Over the two-hour period, the unfunctionalized metallic $MoS_2$ electrode required an additional 0.139 V to maintain the current density. This is very different from the $Et_2$NPh functionalized metallic $MoS_2$ electrode, which only degraded slightly over the two-hour period. The $Et_2$NPh functionalized metallic $MoS_2$ electrode only required an additional 0.014 V to maintain 10 mA/cm$^2$ over the two-hour period. The enhanced stability of the $Et_2$NPh functionalized metallic $MoS_2$ electrode, compared to the unfunctionalized metallic $MoS_2$ electrode, is very encouraging for utilizing these types of functionalized metal chalcogenide nanosheets for realistic long-term catalysis (e.g., HER) applications.

The results presented herein demonstrate a strong correlation between the electron donating strength of ligands and the surface energetics, electron transfer resistance, and the HER catalytic activity of functionalized $MoS_2$ nanosheets. The functionalized nanosheets are more stable to the thermally initiated phase transformation from the metallic 1 T phase to the semiconducting 2H phase. Furthermore, it is shown herein for an exemplary functionalized metal chalcogenide ($Et_2$NPh-$MoS_2$) that functionalization leads to better stability and long-term performance under HER conditions. These results provide a framework for understanding and controlling the balance between catalytic activity and stability for these unique 2D materials. Formation of S—C bonds via covalent surface functionalization protects the catalytically active, metastable, metallic phase. The HER catalytic activity is compromised for ligands that remove appreciable electron density from the $MoS_2$ nanosheets and have more functional groups per $MoS_2$ nanosheet. Thus, there may ultimately be a balance between catalytic activity (optimized initially for metallic phase $MoS_2$, relative to semiconducting phase and functionalized $MoS_2$) and stability (using a functional group that forms a S—C bond to kinetically protect the metastable metallic phase $MoS_2$).

$MoS_2$ Preparation and Functionalization $MoS_2$ powder was obtained from Sigma-Aldrich and vacuum dried at 100° C. overnight prior to use. The chemically exfoliated metallic phase $MoS_2$ was prepared wherein 5 mL of n-BuLi (2.5 M) in hexanes was added to a suspension of 500 mg (3.1 mmol) of $MoS_2$ in 5 mL of dry hexanes and allowed to stir under an inert atmosphere for 48 hours. The reaction was then quenched with ~100 mL of Milli-Q water. After hydrogen evolution ceased, the resulting suspension was then washed twice with ~100 mL of hexane to remove organic impurities and then tip sonicated at ~120 W for one hour in an ice bath. The solution was centrifuged at 800 rpm for 90 min to remove unreacted material. The solution was then decanted off and subjected to three centrifugations at 13200 rpm (21,400 g) for 90 minutes at 20° C. to remove small amounts of $MoS_2$ and LiOH. In addition to previous solution process, $MoS_2$ was synthesized by CVD, by using a three-temperature-zone furnace with dedicated temperature programs for sulfur flakes (Sigma Aldrich), $MoO_3$ powders (Sigma Aldrich), and sapphire substrates (University Wafer). The sulfur flakes and sapphire wafers were placed at Zone 1 and Zone 3, respectively. The $MoO_3$ powders were placed at Zone 2 but loaded in an insert tube which was hooked up to an individual flow controller. A gas of mixed argon and 4 vol % $O_2$ was supplied via the insert tube with a flow rate of 25 sccm while the mainstream flow rate outside the insert tube was about 125 sccm of pure argon. During the growth, the temperatures for Zones 1, 2, and 3 were 140° C., 530° C., and 850° C., respectively. The pressure of the growth chamber was maintained at 1 Torr. The growth duration was about 30 minutes. The given CVD grown method provides semiconducting $MoS_2$ monolayer sheets. To convert the semiconducting $MoS_2$ to metallic phase, the $MoS_2$ was soaked in 2.5 M n-BuLi/hexane solution in inert gas for 10 mins, following with twice hexane washing to remove excessive n-BuLi.

The $MoS_2$ was functionalized by suspending ~100 mg of metallic $MoS_2$ or CVD sheets with substrates in Milli-Q water and adding dropwise ~5 mL of a 10 mg/mL solution of the corresponding tetrafluoroborate salt: 4-p-Diazo-N,N-

Diethylaniline Fluoborate (MP Biomedicals), 4-Methoxybenzenediazonium tetrafluoroborate (Sigma-Aldrich), 3,5-Dichlorophenyldiazonium tetrafluoroborate (Sigma-Aldrich), 4-Bromobenzenediazonium tetrafluoroborate (Sigma-Aldrich), or 4-Nitrobenzenediazonium tetrafluoroborate (Sigma-Aldrich). The solutions were then allowed to stir overnight. For $MoS_2$ nanosheets, the resulting precipitate was collected by filtration and washed twice with 20 mL of water to remove any unreacted material. The resulting material was then dried under vacuum.

Characterization

Metallic unfunctionalized $MoS_2$ nanosheets and functionalized metallic $MoS_2$ nanosheets were prepared for the various characterization experiments. The nanosheets were made by suspending metallic $MoS_2$ in DMF or suspending the modified $MoS_2$ in DMF or anisole and then drop-casting solutions of the modified and unmodified $MoS_2$ nanosheets onto different substrates (Si substrate—AFM and Raman, Au substrate—XPS, glassy carbon substrate—electrochemistry). All nanosheets were stored under a flowing $N_2$ environment (atmospheric pressure) or vacuum until being removed and exposed to ambient air for limited time. CHN analysis of the $Et_2NPh$ and $NO_2Ph$ powders were performed by Midwest MicroLab (Indianapolis, Ind.).

Photoelectron Spectroscopy

XPS data were obtained on a Physical Electronics 5600 system using Al K☐ radiation. The XPS setup was calibrated with Au metal, which was cleaned via Ar-ion sputtering. The energy uncertainty for the core level data is +/−0.05 eV and for the work function measurements are +/−0.025 eV. In order to measure XPS on our series of $MoS_2$ nanomaterials, thin films were made on Au substrates by solution deposition. All samples were checked for and did not exhibit charging, which was verified by X-ray power dependence measurements. Atomic percentages have +/−5% error.

Electrochemistry

Electrochemical measurements were controlled by a CH Instruments 600D potentiostat coupled with a Pine analytical rotator. Measurements were taken in 0.5 M $H_2SO_4$ with a Ag/AgCl reference electrode and vitreous carbon counter electrode. For a typical measurement, 10 µL of a 1 mg/mL solution of the nanosheets suspended in DMF was drop cast onto a freshly polished 5 mm diameter glassy carbon electrode. All LSVs were performed at 5 mV/s and 1600 rpm and the electrolyte was degassed for 15 minutes with $N_2$ prior to experiments. Impedance measurements were carried out with the same setup with no rotation and measured at frequencies ranging from 1 GHz to 10 Hz at a constant overpotential of −0.29 V vs RHE.

Confocal Raman

An inVia Renishaw confocal Raman microscope with a Coherent HeNe 633 nm laser was used for characterizing the Raman signatures of $MoS_2$ nanosheet samples with and without functionalization. The samples were scanned by a 100× objective lens with 5% laser intensity (~0.135 mW) and dispersed by 1800 lines $mm^{-1}$ in air under ambient conditions.

DRIFTS

Diffuse Reflectance Infrared Fourier Transform Spectroscopy (DRIFTS) spectra were acquired on a Bruker ALPHA FTIR Spectrometer using the DRIFTS sampling accessory. The samples were deposited by drop-casting onto aluminum-coated polished silicon wafer fragments (roughly 5 mm×5 mm), and the instrument was baselined against fragments from the same wafer. The instrument settings for both baseline and sample were 128 scans, 2 $cm^{-1}$ resolution, from 360 to 7000 $cm^{-1}$.

Atomic Force Microscopy

Atomic force microscopy (AFM) was used to image the 2D $MoS_2$ flakes that were solution deposited onto a silicon substrate. The ambient environment AFM uses a Park AFM XE-70 controller and is housed inside an acoustic box that is located on top of a vibration isolation table. Budget sensors silicon cantilevers (Tapp300G, ~300 kHz) were used to image surface topography images in intermittent contact mode.

Scanning Electron Microscopy

Scanning electron microscopy (SEM) was used to image the $MoS_2$ nanosheets that were solution deposited onto a silicon substrate in a concentration that is consistent with the electrodes. All SEM images were taken in a FEI Nova 630 system.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A composition comprising:
   a metal chalcogenide comprising $MoS_2$ having a surface; and
   a ligand comprising a phenyl ring and a moiety, wherein:
   the $MoS_2$ is at least partially in a 1T crystalline phase,
   the ligand is covalently bound to the surface, and
   the moiety comprises at least one of a halogen or $(CH_3CH_2)_2N$.

2. The composition of claim 1, wherein the metal chalcogenide is in a form comprising at least one of a sheet or a particle.

3. The composition of claim 2, wherein the sheet comprises at least one monolayer of the metal chalcogenide.

4. The composition of claim 2, wherein the sheet has a thickness between 5.0 nm and 30 nm.

5. The composition of claim 2, wherein the particle has a characteristic length between 5.0 nm and 50,000 nm.

6. The composition of claim 1, wherein the ligand comprises at least one of $Cl_2Ph$ or BrPh.

7. The composition of claim 1, wherein the ligand comprises at least one of an electron donating functional group or an electron withdrawing functional group, as measured by at least one of a Hammett parameter or a work function.

8. The composition of claim 7, wherein the Hammett parameter is between −0.5 and 1.0.

9. The composition of claim 7, wherein the work function is between 3.0 eV and 6.0 eV.

10. The composition of claim 1, wherein:
the composition catalyzes the hydrogen evolution reaction (HER), and
the composition generates a HER catalytic current density of at least 10 mA/cm$^2$ when provided with an overpotential of less than 1000 mV.

11. A composition comprising:
$MoS_2$ in a form of at least one of a particle or a sheet; and
a ligand covalently bound to the $MoS_2$, wherein:
the ligand comprises at least one of 3,5-$Cl_2$Ph, p-BrPh, or p-$(CH_3CH_2)_2$NPh, where Ph is a phenyl ring,
the $MoS_2$ is it least partially in a 1T crystalline phase,
the form has a characteristic length between 5.0 nm and 50,000 nm,
the composition is characterized by a Hammett parameter between −0.5 and 1.0,
the composition catalyzes the hydrogen evolution reaction (HER), and
the composition generates a HER catalytic current density of about 10 mA/cm$^2$ when provided with an overpotential of less than 1000 mV.

* * * * *